United States Patent [19]

Nazarathy et al.

[11] Patent Number: 5,161,044

[45] Date of Patent: Nov. 3, 1992

[54] OPTICAL TRANSMITTERS LINEARIZED BY MEANS OF PARAMETRIC FEEDBACK

[75] Inventors: Moshe Nazarathy, Palo Alto; Josef Berger; Yishai Kagan, both of Santa Clara, all of Calif.

[73] Assignee: Harmonic Lightwaves, Inc., Santa Clara, Calif.

[21] Appl. No.: 685,966

[22] Filed: Apr. 15, 1991

Related U.S. Application Data

[63] Continuation of Ser. No. 378,328, Jul. 11, 1989, abandoned.

[51] Int. Cl.$^5$ .............................................. H04B 10/00
[52] U.S. Cl. ...................................... 359/157; 359/132; 359/187
[58] Field of Search .......................... 455/609–611, 455/613, 617, 618; 359/132, 154, 157, 161, 180, 187

[56] References Cited

U.S. PATENT DOCUMENTS

| | | | |
|---|---|---|---|
| 4,501,022 | 2/1985 | Oswald | 455/618 |
| 4,504,976 | 3/1985 | Beaudet | 455/613 |
| 4,893,300 | 1/1990 | Carlin et al. | 455/617 |

OTHER PUBLICATIONS

"Titanium–Diffused Lithium Niobate Waveguide Devices", by R. C. Alferness, Guided–Wave Optoelectronics (1988).

"Feasibility of Multi–Channel VSB/AM Transmission on Fiber Optic Links", Jack Koscinski, General Optronics Corporation, pp. 1–9, Jan. 1987.

"Systems Characteristics of Direct Modulated and Externally Modulated RF Fiber Optic Links", by Stephens et al., Journal of Lightwave Technology, vol. LT–5.

"Optical Waves in Crystals", by Yariv et al., (Ch. 11: Guided Waves and Integrated Optics).

"Comparison of Second and Third Order Distortion in Intensity Modulated InGaA: Lasers and an LiNbO3 External Modulator", Paper WK2, OFC89', Conference on Optical Fiber Communications, Houston, Tex., Feb. 1989.

"High Sensitivity Optical Analog Link Using an External Modulator", by Betts et al., *CLEO* (1989) Apr. 24–28, Paper TUJ19.

Primary Examiner—Edward L. Coles, Sr.
Assistant Examiner—Kinfe-Michael Negash
Attorney, Agent, or Firm—Steven F. Caserza

[57] ABSTRACT

The invention discloses a general technique of taking advantage of the stability of the modulator transfer characteristic in order to correct for second and third order distortion. These objectives are achieved in a way compatible with the nature of the video distribution frequency formats. The method of this invention for linearizing the amplitude transfer characteristic of integrated optic devices for analog transmission is accomplished by injecting pilot signals, monitoring the harmonic and intermodulation distortion content of the optical output, and feeding back bias signals to parametrically tune the operating points of the integrated optic modulator and of a predistortion network. General principles for realizing suitable parametrically tunable predistortion networks are also presented.

50 Claims, 12 Drawing Sheets

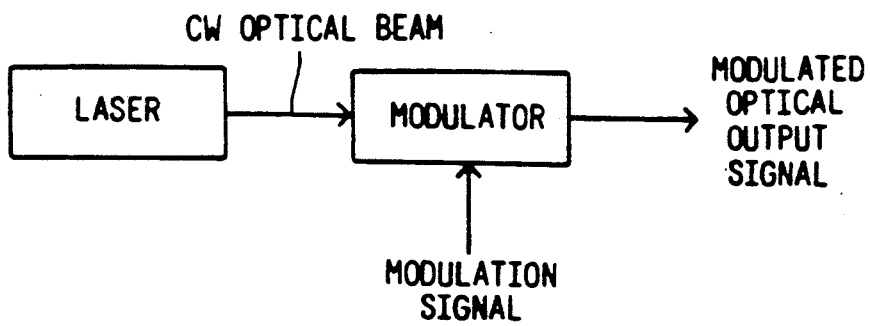
FIG. 1 (PRIOR ART)
FIG. 2 (PRIOR ART)
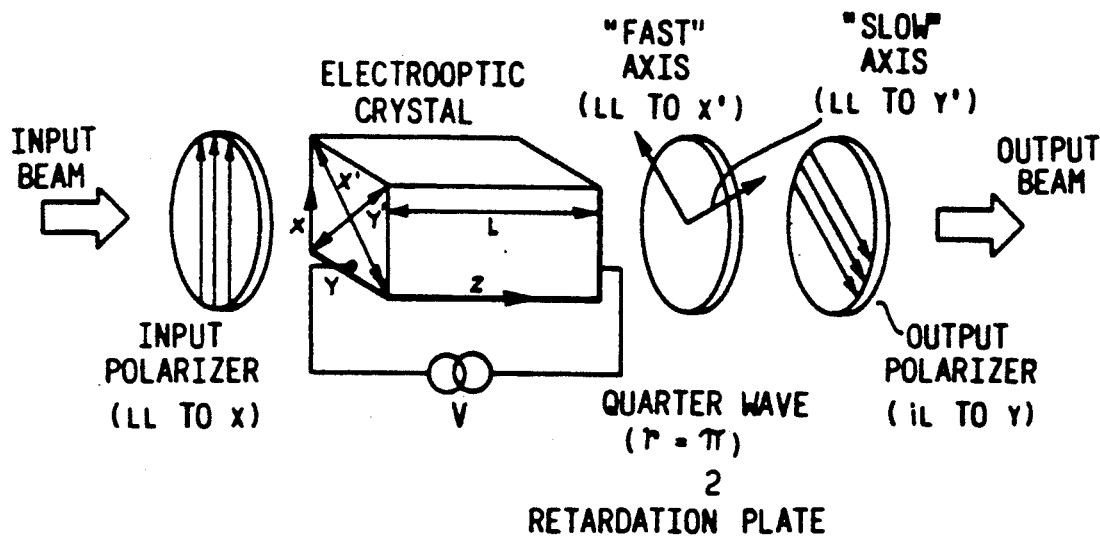
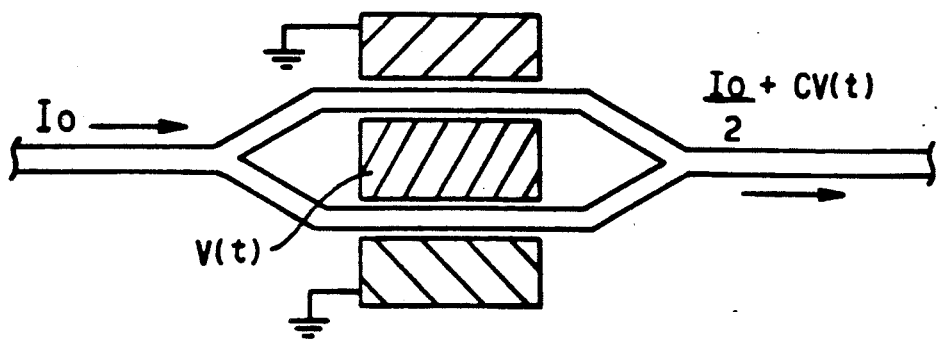
FIG. 3 (PRIOR ART)

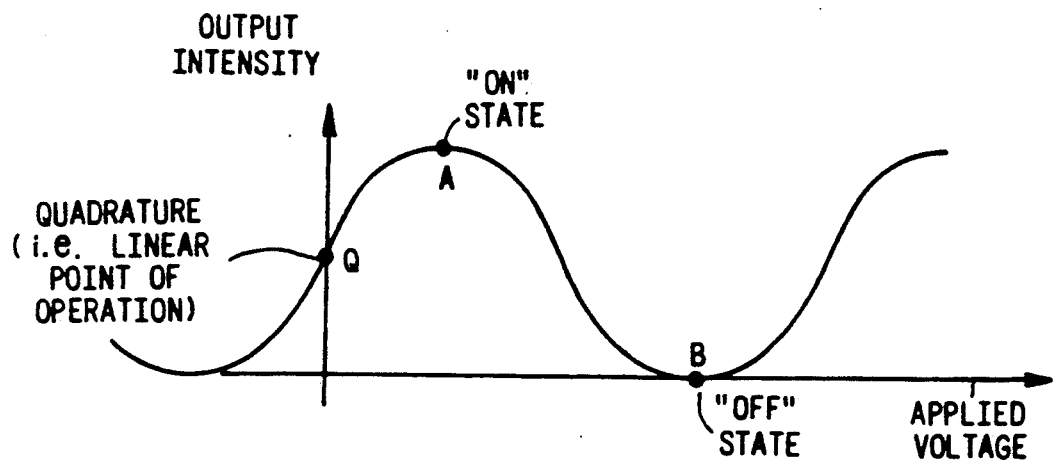
FIG. 4 *(PRIOR ART)*
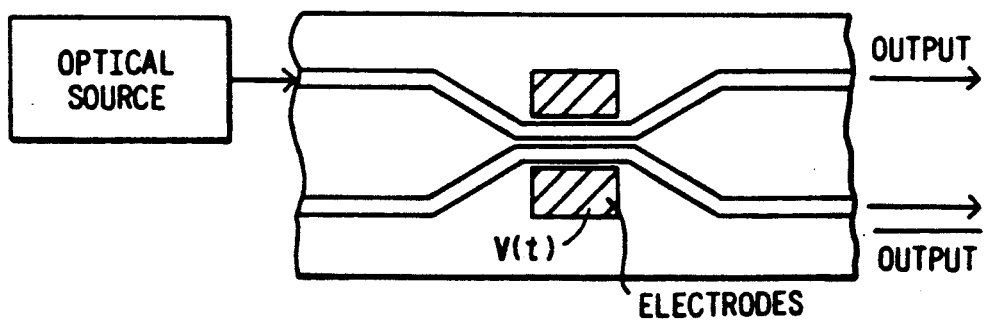
FIG. 5 *(PRIOR ART)*

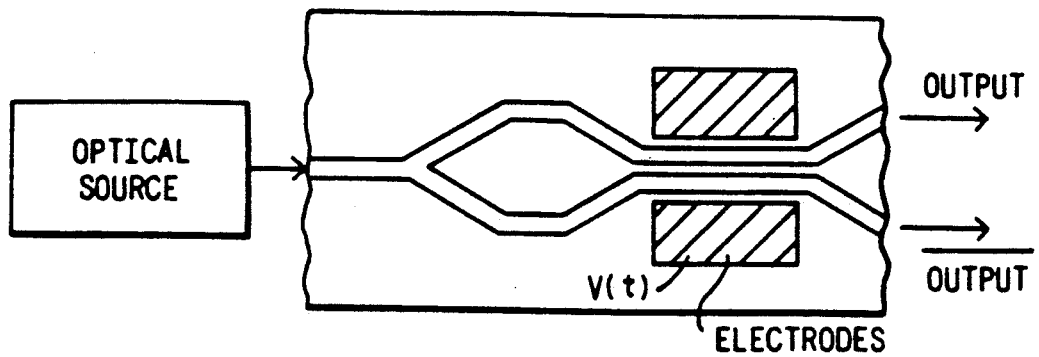
FIG. 6 (PRIOR ART)
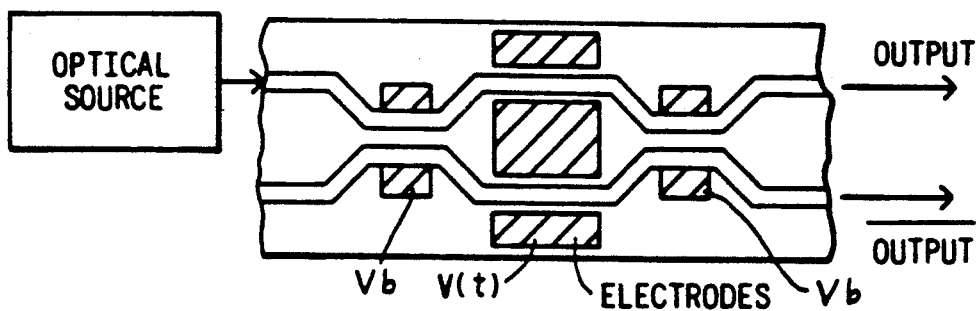
FIG. 7a (PRIOR ART)
FIG. 7b
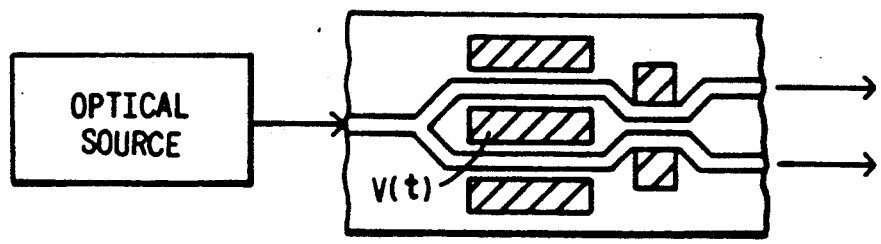

$$Y(x) = \frac{(1+x)^{2/3} - (1-x)^{2/3}}{(1+x)^{2/3} - (1-x)^{2/3}}$$

OPTICAL TRANSMITTERS LINEARIZED BY MEANS OF PARAMETRIC FEEDBACK

CROSS REFERENCE TO RELATED APPLICATIONS

This application is a continuation of U.S. application Ser. No. 07/378,328 filed Jul. 11, 1989 now abandoned.

INTRODUCTION

Although digital communication has been gaining in importance, analog signal transmission is still an important transmission method, particularly in regard to the distribution of video signals. The broadcast distribution of television signals and the distribution of television signals via cable are most obvious examples of analog communications. At the high bandwidths required for video signals, the attenuation of transmission lines such as coaxial cable and the bandwidth of repeater amplifiers are significant factors dictating the use of the transmission format which best preserves bandwidth, namely Amplitude Modulation (AM). In particular, AM-vestigial sideband (AM-VSB) modulation is used in television. The penalty to be paid for the reduced bandwidth of AM as compared to digital transmission is a higher signal to noise ratio required for AM transmission (about 30 dB more than for digital transmission).

In particular, fiber optical transmission has been considered for cable television (CATV) systems as a means to transmit AM/frequency division multiplexed (AM/FDM) signals over longer distances, without repeaters, as described by J. Koscinski, "Feasibility of Multichannel VSB/AM Transmission on Fiber Optic Links," NTCA Technical papers, Las Vegas 1987, p. 17. Such fiber optic AM links apply optical intensity modulation upon a light source, sending the modulated light signal via fiber to a receiver which converts the optical intensity signal back to an electrical signal. The modulating electrical signal is a composite signal with the AM video channels multiplexed in frequency, hence the term AM/FDM.

The useful length of a fiber optic analog link is determined by factors such as the optical power available, the relative intensity noise (RIN) of the optical source (which is typically a laser), and the sensitivity of the optical receiver. Also of importance is the non-linearity of the modulation characteristics of the optical source. Second order and third order distortion cause crosstalk, intermodulation distortion, and interference among the transmitted channels.

With present technology, the limiting factors for optical AM links used for cable television transmission are the RIN of the laser source and the second order distortion resulting from the light-current modulation characteristics.

External modulation of the light source has been proposed and demonstrated for analog transmission via fiber, as described by W. E. Stephens and R. Joseph, "System Characteristics of Direct Modulated and Externally Modulated RF Fiber-Optic Links", Journal Lightwave Technol., Vol. LT-5, pp. 180-387. When using an externally modulated light source, as shown in FIG. 1, the laser is run in the continuous wave (CW) mode, i.e. at constant output power into an optical modulator, which also has an electrical input port. The resulting optical output signal from the optical modulator is a modulated light beam, with an optical intensity envelope that is a replica of the modulating electrical signal.

Typical prior art electro-optic amplitude modulators are described by Amnon Yariv and Pochi Yeh, "Optical Waves in Crystals", (Ch. 7: Electro-optics, Ch. 11: Guided waves and integrated optics), Wiley, 1984: R. Alferness, "Titanium Diffused Lithium Niobate Waveguide Devices", in "Guided-Wave Optoelectronics", Tamir ed., Springer-Verlag, 1988. Such a typical prior art amplitude modulator may be structured as either a phase modulator between crossed polarizers (FIG. 2), or an interferometric device superposing the outputs of two phase modulators (FIG. 3), i.e. a Mach-Zehnder interferometer. In turn, an electro-optic phase modulator is constructed by passing the optical beam through a material which is electro-optic, i.e. when an electric field is applied to it, the refractive index of the material and thus the speed of light and the time of flight delay, changes linearly with the applied voltage.

Of particular interest are integrated-optic modulators, where the electro-optic interactions occur in optical waveguides that are patterned into optical substrates via microlithographic techniques. Such integrated-optic devices tend to require lower drive voltages than bulk modulators, since the small dimensions of the optical guides are such that the electric fields across the optical guides are very intense.

The advantage of externally modulating a laser as opposed to directly modulating the drive current of the laser is that the so called chirp effect—a parasitic FM modulation created when modulating the laser current—is avoided. Also, more significant for AM fiber optic transmission, the intensity noise of lasers which are run CW at constant power tends to be lower than that of lasers under broadband modulation.

The main disadvantage of external modulation is the need for a second optical device-the additional modulator, with increased cost, complexity, and insertion loss through the modulator. A large fraction of this loss is inherent or intrinsic in the physics of a modulator, which dictate a voltage-light characteristic that is typically a raised cosine curve, as shown in FIG. 4. The maximum points A of the curve correspond to maximum transmission (on-state) of the device, where ideally or intrinsically in the absence of excess losses (absorption of light in the guiding material) the transmission is 100%. The minimum points B represent the off-state of the device, where ideally all the light is blocked from reaching the output. For analog transmission, the device is biased at the 50% transmission point Q, the so called quadrature point. At the quadrature bias point Q, half the light is dissipated in the device, however, at this point the linearity is the best, i.e., over a limited range around Q, modulation signal voltage deviations from this state translate into proportional intensity deviations with only slight distortion, caused by the deviation of the sine curve from a straight line.

Analog AM transmission systems and distribution networks benefit from fiber-optic transport, since the distance between electrical repeaters is greatly increased. However, the requirements on RIN and on second-order linearity are very stringent for directly modulated lasers to be used in the optical transmitters. An alternative to using directly modulated lasers is using external modulators.

The advantage of using external modulators vs. directly modulated lasers in terms of the non-linear intermodulation distortion have been discussed by G. E.

Bodeep and to. E. Darcie, "Comparison of Second and Third Order Distortion in Intensity Modulated InGaAsP Lasers and an LiNbO3 External Modulator", Paper WK2, OFC89' Conference on Optical Fiber Communications, Houston, Texas, February 1989, where it was concluded that external modulators tend to have lower second order distortion but higher third order distortion than directly modulated lasers. However, the ability to keep down the second order distortion of an external modulator depends on how close to the quadrature point the device is biased. Various fabrication imperfections, temperature changes, optical damage, etc. cause the bias point to drift away from the quadrature point, in which case the second order distortion may become substantial.

A recent experimental demonstration of AM fiber transmission utilizing an external Mach-Zehnder modulator, and a high power low RIN 1.3 μm solid state Nd:YAG laser pumped by a high power GaAlAs/GaAs laser diode array, is described by G. E. Betts, L. M. Johnson, C. H. Cox III, S. E. Lowney, TuJ19, "High Sensitivity optical analog link using an external modulator", CLEO Apr. 24–28, 1989, Baltimore, Md.

In prior art external modulation techniques for fiber-optic AM transmission, half the optical power is dissipated in the external modulating device because of the need to bias the modulator in quadrature, half-way between its on and off states, in order to attain the maximum degree of linearity.

Copending U.S. patent application Ser. No. 07/370,711, filed Jun. 23, 1989 on an invention entitled "Optical Distribution of Analog Signals Using Optical Modulators With Complementary Outputs" teaches the ability to utilize substantially all the optical power, including the 50% which is wasted in prior art modulators. The power previously wasted in prior art modulators is utilized in accordance with the teachings of this invention to accomplish transmission to either a different receiver, as required in situations involving distribution of signals to multiple points as in cable television, for example, or to the same receiver, in which case a novel signal processing technique is used to recombine the two signals. When the previously wasted power is routed to the same receiver, an important benefit results: partial cancellation of RIN and even orders of distortion.

Copending U.S. patent application Ser. No. 07/370,711 teaches structures which utilize modulators with pairs of complementary outputs, such that optical energy is not wasted but is rather transferred from one output to the other in accordance with the modulating signal. Unlike prior art integrated optic modulators having multiple output ports, such an optical modulator having multiple output ports is used to provide multiple output signals which are simultaneously routed to a plurality of optical receivers, or simultaneously routed to complementary input ports of a single optical receiver.

Complementary modulation means include those described by R. Alferness, "Titanium Diffused Lithium Niobate Waveguide Devices", in "Guided-Wave Optoelectronics", to. Tamir ed., Springer-Verlag, 1988, and include:
a directional coupler (FIG. 5), including electrodes for receiving signals for modulation,
a Y-fed directional coupler (FIG. 6), including electrodes for receiving a modulating signal; and
balanced-bridge interferometers (also known as 1×2 and 2×2 switches): devices which consist of either two directional couplers or a y-junction and a directional coupler, with a two-arm interferometer in between (FIGS. 7a and 7b, respectively).

Additional complementary modulation means are described in copending patent application Ser. No. 07/370,711.

Linearity of Electro-optic Modulation Means

Both Mach-Zehnder type modulators and certain types of complementary output modulators such as the balanced bridge interferometer are described by a voltage-intensity transfer characteristic which is a raised cosine as shown in FIG. 4. In the case of directional coupler type devices, the complementary outputs are both described by raised cosines but the curves are shifted with respect to each other such that when one is at minimum the other is at maximum, and the sum of the two is constant, corresponding to constant output power from the two complementary outputs, the best operating bias point for linear operation is quadrature point Q which is located half way between the on and off states.

In general, the bias point is determined by the geometry of the device, e.g. the imbalance in length between the two arms in a Mach-Zehnder modulator, the length of the interaction regions in directional coupler type devices, as well as by static DC voltages applied to the electrodes of the device. Other factors such as optical damage in the presence of excess optical power, temperature variations, and the like may cause the bias point to drift.

Around quadrature point Q the transfer characteristic appears to be an odd function. At quadrature point Q, the second order harmonic distortion is nulled out, as are all even orders of distortion. Only odd orders of distortion remain present at quadrature bias point Q. The most important source of non-linearity remaining is the third order harmonic distortion, since the 5th, 7th, and subsequent higher odd orders of distortion are usually smaller than the third order.

Mathematically, the characteristic around the quadrature bias point appears to be of the form sin(θ), which may be expanded into a power series as equation $$\sin(\theta) = \theta - \frac{1}{6}\theta^3 + \ldots \tag{1}$$

where the modulation angle $\theta$ is proportional to the voltage v(t) applied to the electrodes:

$$\theta = \frac{\pi}{V_\pi} v(t) \tag{2}$$

The absence of a second order term $\theta 2$ is apparent in this case, however if the device deviates from quadrature point Q by a small angle $\theta_b$ its characteristic is given by $$\sin(\theta + \theta_b) = \sin(\theta)\cos(\theta_b) + \cos(\theta)\sin(\theta_b) = \tag{3}$$

$$\theta_b + \cos(\theta_b)\theta - \frac{\theta_b}{2}\theta^2 - \frac{1}{6}\cos(\theta_b)\theta^3$$

The most obvious effect of non-quadrature biasing is the appearance of the second order harmonic distortion term:

$$\frac{1}{2} \theta_b \theta^2 = \frac{\pi^2 \theta_b}{2V_\pi^2} v^2(t) \quad (4)$$

Another method to assess the presence or absence of second and third order distortion terms is by looking at the second and third order derivatives of the transfer characteristic $$g(v) = g(0) + g'(0)v + \frac{1}{2} g''(0)v^2 + \frac{1}{6} g'''(0)v^3 \quad (5)$$

To suppress the second order term one needs to have $g''(0)=0$. The characteristic $\sin(\theta+\theta_b)$ has a null second order derivative with respect to $\theta$ at the point $\theta_b=0$.

The Problem

The problem of analog transmission via fiber optics has received strong impetus with the introduction of some AM fiber links based on novel distributed feedback (DFB) semiconductor lasers. Analog AM transmission systems and distribution networks benefit from fiber-optic transport, since the distance between electrical repeaters can be significantly increased as compared with electronic distribution networks. However, the requirements on second-order and third-order linearity are very stringent for directly modulated lasers to be used in the optical transmitters, since the presence of non-linearities causes intermodulation distortion which, in the case of CATV transmission for example, shows up as intolerable degradation of the television picture. Because of non-linearity of the optical source, the modulating signal amplitude has to be limited to small values in order to maintain the composite triple beat and second order distortion specifications under a tolerable level. A reduction of the optical source non-linearity would directly translate into the ability to increase the modulation signal amplitude while still maintaining the composite distortion specifications. An increased modulation amplitude (modulation index) is equivalent to better signal to noise ratio, i.e., the ability to distribute the analog signal over larger distances, to split the signal to more receiving sites, or to transmit more channels on the same link. The main obstacle with AM fiber transmission is how to overcome the non-linearity limitations of optical sources for analog transmission. Currently used approaches include:

1. Careful laser device selection, using distributed feedback lasers and other types of semiconductor low-noise lasers, and trying to carefully select individual devices or modify the fabrication process in order to produce a more linear response, for example preventing leakage current around the active lasing area. The problem with this approach is that currently the yield for devices with sufficient linearity is quite low, and reliable fabrication techniques for more linear laser devices have not yet been found.

2. Feedforward techniques, as described by J. Koscinski, "Feasibility of multichannel VSB/AM transmission on fiber optic links" NCTA Technical papers, Las Vegas 1987 p. 17. In these techniques, compensation of the nonlinearity is achieved by isolating the distortion produced in a nonlinear circuit and subsequently injecting the processed error back into the circuit. The disadvantages of these methods are in the requirements to use matched sources and the cost of two optical sources and the complexity of delay and gain balancing.

3. Negative feedback techniques, such as described by J. Koscinski, "Feasibility of multichannel VSB/AM transmission on fiber optic links," NCTA Technical papers, Las Vegas 1987 p. 17, rely on a photodiode to monitor the optical signal and provide the necessary feedback signal. The amount of distortion compensation depends on the feedback gain. Although the application of negative feedback is straightforward, large bandwidth requirements may create problems at high frequencies rendering this technique impractical.

An alternative to directly modulating lasers is using external modulators in conjunction with CW lasers. A directly modulated laser such as a DFB laser tends to be more sensitive to optical back reflection, and noisier than a CW laser which is modulated externally. The back reflection into the laser yields a non-linear light vs. current response when coupled with chirping effects of the directly modulated laser. The advantages of using modulators vs. lasers in terms of the non-linear intermodulation distortion have been discussed by G. E. Bodeep, T. E. Darcie, "Comparison of second and third order distortion in intensity modulated InGaAsP lasers and an $LiNbO_3$ external modulator," Paper WK2, OFC89' Conference on Optical Fiber Communications, Houston, Texas, February 1989, where it was concluded that external modulators tend to have lower second order distortion but higher third order distortion then directly modulated lasers. However, the ability to maintain the second order distortion of a modulator at a sufficiently low level cannot be taken for granted, and depends on how close to the quadrature point the device is biased. Fabrication imperfections, temperature changes, optical damage, and the like may cause the bias point to drift away from quadrature, in which case the second order distortion becomes more substantial. In order to use external modulators effectively for analog transmission applications, the drift in the bias point (which causes second harmonic distortion) as well as the third order harmonic distortion of the device must be eliminated or greatly reduced, since prior art modulators provide adequate linearity only over a very limited range around the quadrature point.

It is generally known that external modulators have a transfer characteristic that is considerably more stable than that of lasers. Unlike the lasers' light vs. current curve, the shape of the modulators' transfer characteristic is generally unaffected by optical power, temperature, aging, and the like, although the quiescent point of operation on the fixed transfer characteristic is affected by these factors.

If means were found to extend the linear range around the quadrature point and to reliably maintain the quadrature point, then the modulation index of the analog information signal could be increased and the performance of analog links improved, with better signal to noise ratio, and the ability to provide longer links.

BRIEF DESCRIPTION OF THE DRAWING

FIG. 1 depicts a typical prior art system including a laser and an external modulator;

FIG. 2 is an example of a prior art amplitude modulator utilizing a phase modulator located between cross polarizers;

FIG. 3 is an example of a typical prior art Mach-Zehnder interferometer;

FIG. 4 is a graph depicting a raised cosine transfer characteristic and the quadrature point of linear operation of an external modulator;

FIG. 5 depicts a typical prior art directional coupler;

FIG. 6 depicts Y-fed directional couplers;

FIGS. 7a and 7b depict balanced-bridge interferometers;

SUMMARY

The solutions provided by this invention for linearizing the response of electro-optic modulators are of great interest to the cable television industry in its attempt to expand its networks and reduce prices by cutting down on maintenance expenses and to bring high-definition television (HDTV) to customers. The solutions provided by this invention are also of great interest to the telephone industry in its attempt to bring broadband ISDN services over optical fiber to the homes of residential customers.

The invention discloses a general technique of taking advantage of the stability and repeatability of the modulator transfer characteristic in order to correct for second and third order distortion. These objectives are achieved in a way compatible with the nature of the video distribution frequency formats.

The method of this invention for linearizing the amplitude transfer characteristic of integrated optic devices for analog transmission is accomplished by injecting a pilot signal, monitoring the harmonic distortion content of the optical output, and feeding back bias signals to parametrically tune the operating points of the integrated optic modulator and of a predistortion network. General principles for realizing suitable parametrically tunable predistortion networks are also presented.

DETAILED DESCRIPTION

Figure 8:
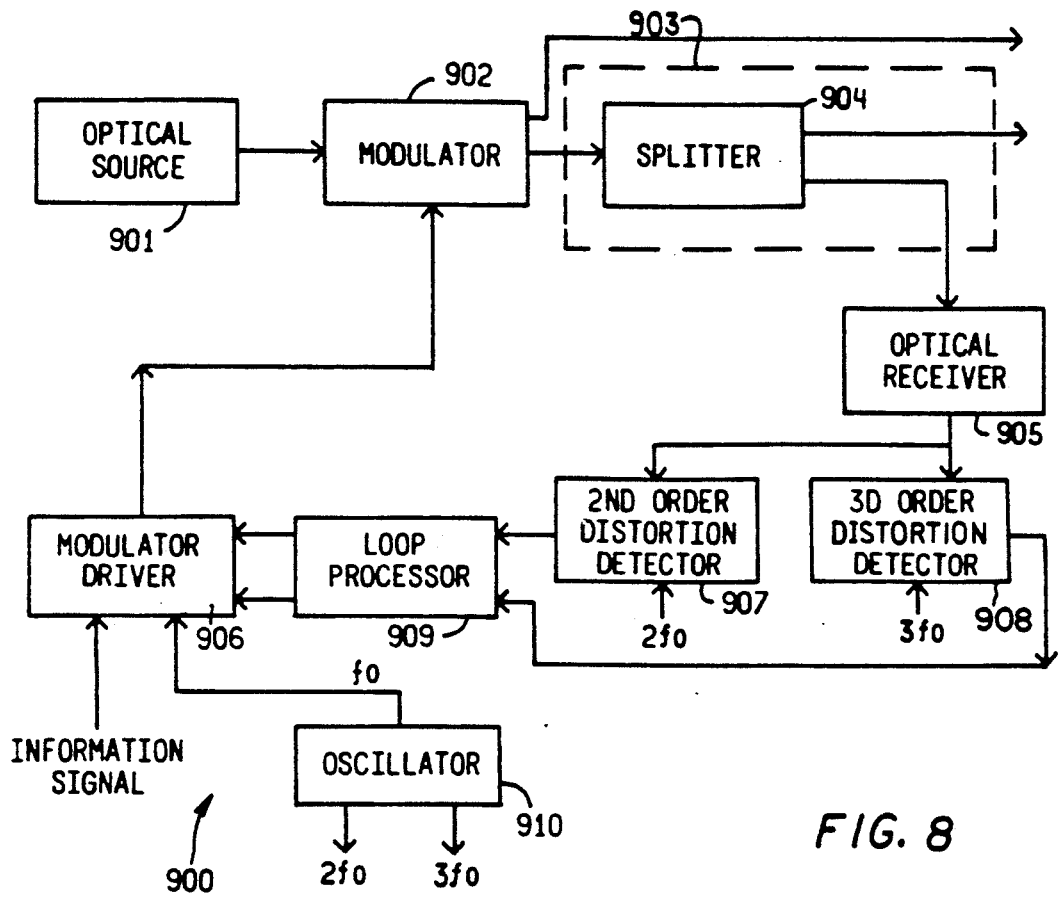
FIG. 8 depicts one embodiment of an optical transmission or distribution system constructed in accordance with the teachings of this invention.

FIG. 8 depicts one embodiment of an optical transmission or distribution system constructed in accordance with the teachings of this invention which is suitable for distribution of broadband analog electronic signals. Transmitter system 900 includes modulator means 902, a fiber optic distribution network 903 including one or more splitters 904, and at least one optical receiver 905.

The following discussion, by way of example, describes the teachings of this invention when used for the distribution of multiple video channels for cable television. It is known that the composite video signal in a cable TV distribution system and in off the air TV broadcast systems is a highpass signal starting at 54 MHz, with the individual AM/VSB modulated video channels stacked in frequency at intervals of 6 MHz (except for some frequency gaps used for FM radio, mobile radio, etc.)

In accordance with the teachings of this invention, the low-pass vacant region (e.g. from 0 to 54 MHz in USA Cable Systems) of multichannel analog transmission (or other vacant spectral regions such as gaps between channel groups) is utilized for transmitting one or more pilot tones generated by pilot tone oscillator 910, which are used to monitor the presence of second and third order distortion, via second order distortion detector 907 and third order distortion detector 908 respectively. Signals from detectors 907 and 908 resulting from the monitoring of the pilot tones at the receivers are fed back, via loop processor 909, to modulator driver 906 in order to hold modulator 902 at the quadrature bias operating point, to the effect of eliminating or reducing second order distortion, and to parametrically tune non-linear predistortion circuits within modulator driver 906 in order to eliminate or reduce its inherent second order distortion and eliminate or reduce third-order distortion and second order distortion of the overall system by generating opposing distortions in modulator 902 and in the compensating non-linearity within modulator driver 906.

The unique form of feedback used in accordance with the teachings of this invention for improving the linearity of analog transmission signals is labelled here "parametric feedback," since the feedback is applied to parameters of the modulator and its driver rather than to the modulating signal itself.

Comparing the parametric feedback method of this invention with prior art negative feedback methods described by Koscinski, supra, it is apparent that the difference lies in the fact that in accordance with the present invention, slowly varying feedback is applied to the parameters of the predistortion network and modulator, which control the quiescent point, whereas in the prior art fast varying feedback is applied to the input signal itself. In the present invention, output diagnostic signals of intermediate frequency are monitored and used to actuate the feedback, whereas in the prior art the high frequency output signal is used to actuate the feedback. The advantages of utilizing lower frequency signals in the feedback loop are apparent.

While a predistortion network affecting the input signal itself may be an obvious first step to the challenge of extending the small-signal range of linear operation of a modulator, in the wake of device to device variations and device drifts this solution may not be viable. The adaptive parametric feedback solution taught in this invention, and tailored to the particular characteristics of electro-optic modulators, provides a consistent solution to the problem of improving non-linearity of electro-optic modulators for analog transmission as required for distribution of video signals via fiber optics and other emerging applications.

The combined effect of the anti-distortion measures of this invention is to reduce the overall non-linearity of the optical analog transmitter to the degree that cable television system specifications of composite second order and composite triple beat are met for higher modulation indexes, i.e., for higher signal to noise ratios.

In one embodiment, transmitter 900 of this invention includes a continuous wave laser, such as a DBF semiconductor laser or a solid state diode pumped laser, or an external cavity or a semiconductor Fabri-Perot laser serving as optical source 901. The output of optical source 901 is fed into modulator means 902, which may be, for example, an electro-optic Mach-Zehnder modulator, directional coupler, balanced bridge interferometer, or more generally any suitable modulating means. Modulating means 902 is electrically driven by modulation driver 906 which serves several functions:

1) Modulation driver 906 linearly amplifies the information signal and feeds the result to modulating means 902 conditioned at the proper level in amplitude and in impedance.

Figure 11:
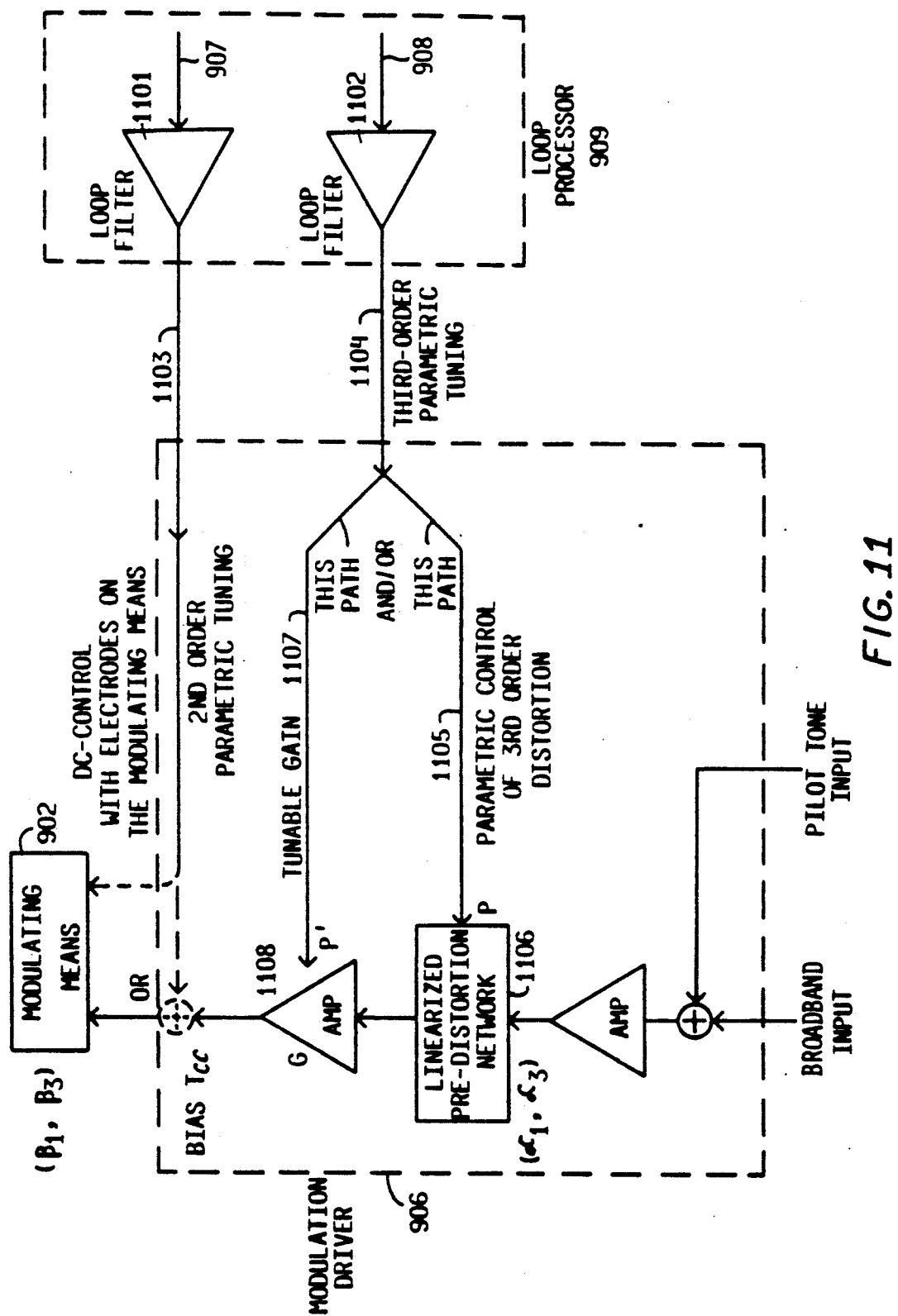
FIG. 11 is a diagram of another embodiment of a transmission or distribution system constructed in accordance with the teachings of this invention.

2) Modulation driver 906 provides a DC or slowly varying control voltage which establishes the modulator bias point. This slowly varying control voltage is used to steer modulating means 902 to the quadrature point where the second-order derivative of the transfer characteristic is nulled out. A typical embodiment, as shown in FIG. 11, comprises a bias-tee circuit combining the AC and quasi-DC components while keeping the two paths mutually isolated. The bias-tee circuit combines the quasi-DC control voltage with the broadband information voltage (i.e., the composite video signal in the case of CATV distribution).

Figure 9:
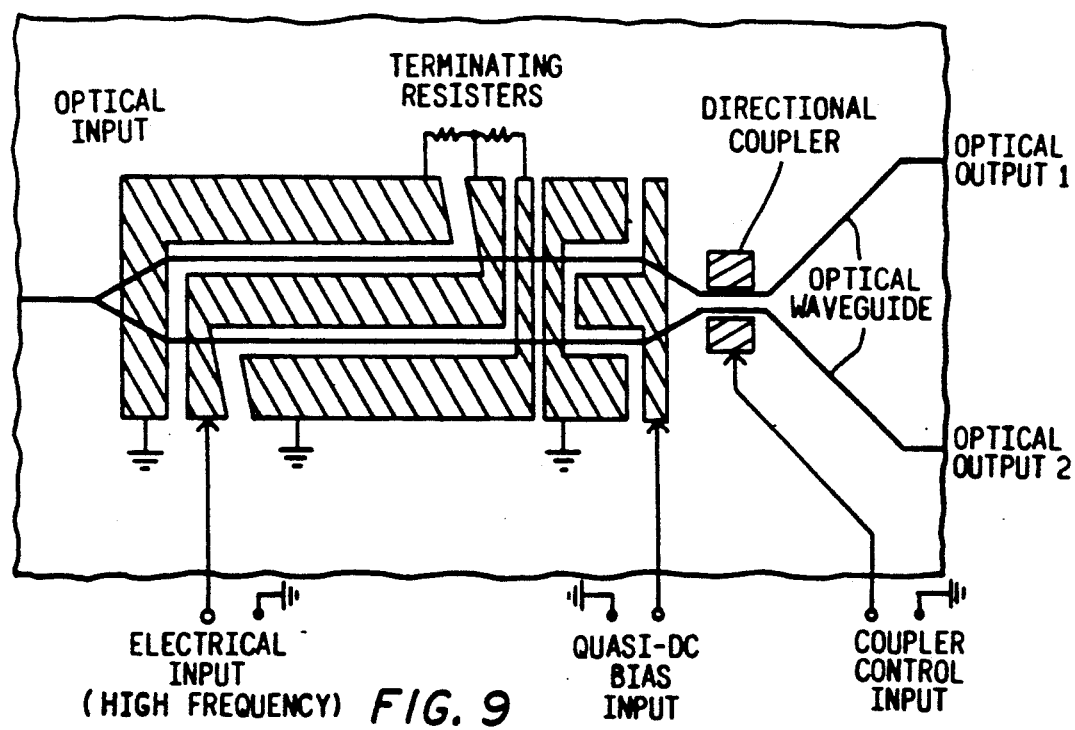
FIG. 9 is one embodiment of a traveling wave balanced-bridge interferometer suitable for use in accordance with the teachings of this invention.

3) In another novel embodiment biasing electrodes are provided in the integrated optic modulator separate from the high frequency modulating electrodes. Unlike prior art where DC and high frequency signals are combined in one set of electrodes, the claimed embodiment results in separating the high-speed circuitry from the biasing electronics. The high frequency electrodes do not have to carry any DC currents. In this case the modulation driver simply routes the quasi-DC signal to the biasing electrode. An embodiment for a travelling wave balanced bridge interferometer is shown in FIG. 9.

4) Modulation driver 906 provides a parametrically tunable non-linear predistortion to the useful information signal in order to compensate for the residual non-linearity of modulating means 902, after the modulating means is brought to the vicinity of the quadrature point. Parametrically tunable means that the quiescent operating points of the circuit (the parameters) can be tuned to affect the amounts of various orders of non-linearity.

5) Modulation driver 906 superposes one or more pilot signals from pilot tone oscillator 910 upon the electrical information signal, such that the spectrum of the pilot signal(s) and the second and third harmonics of the pilot spectral components fall outside the passband of the useful information signal to be distributed. The second and third harmonics of the spectral components of the pilot signal(s) are monitored at the output of optical receiver 905 by harmonic distortion detectors 907 and 908 and used to actuate the parameters of the modulation driver 906 in such a way that the overall second and third order distortion is nulled out. This parametric feedback is a form of negative feedback technique, however the feedback is not applied in real-time to the fast varying information signal but rather it is slowly applied to the parameters controlling the overall nonlinearity of the system, in order to null the overall nonlinearity out.

To this end, an optical splitter is placed upon at least one optical output of modulating means 902 to route a portion of the transmitted optical power to a monitoring optical receiver (which can be thought of as part of transmitter 899).

Optical splitter 904 can, for example, be realized either as a fiber optic directional coupler or be integrated on the same integrated optic substrate with the modulating means 902, or be realized as a bulk optic beam splitter.

Monitoring optical receiver 905 feeds its output signal into two synchronous harmonic detectors 907 and 908, which detect the presence in the optical output of modulating means 902 of second and third harmonic spectral components of the pilot tone, respectively. In the case when multiple tones are used, the detectors detect the presence of intermodulation tones corresponding to the pilot tones.

Figure 10:
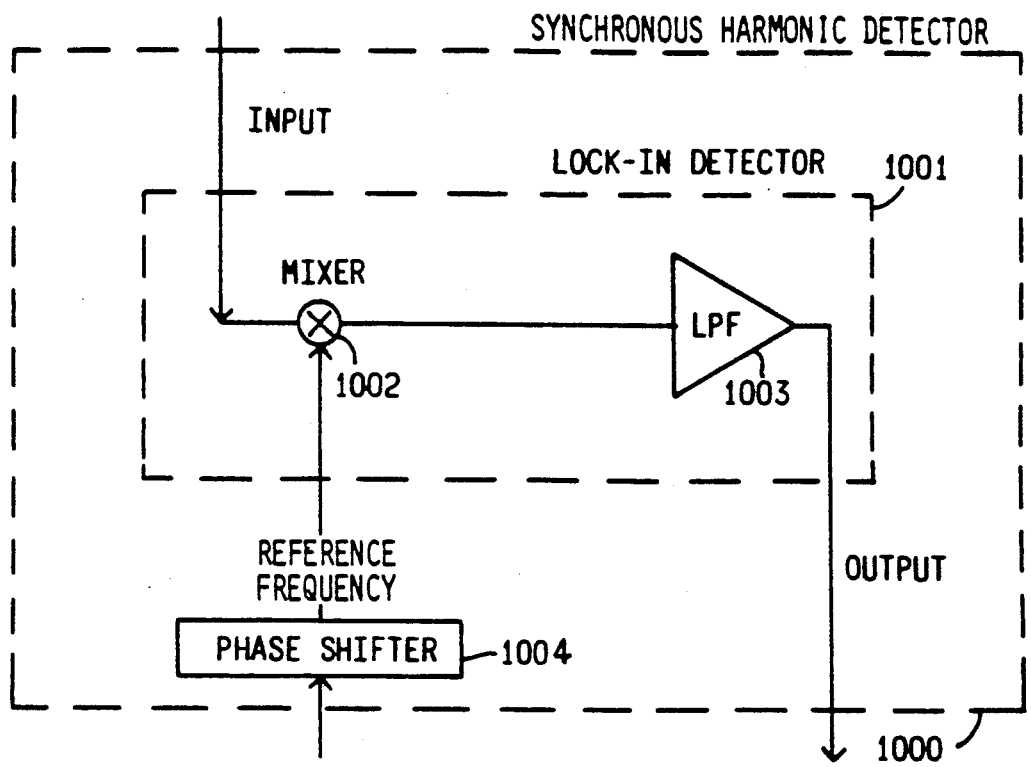
FIG. 10 is one embodiment of a synchronous harmonic detector suitable for use as one or both detectors 907 and 908 of FIG. 8.

One possible embodiment of a synchronous harmonic detector suitable for use as one or both detectors 907 and 908 is shown in FIG. 10. Synchronous harmonic detector 1000 comprises lock-in detector 1001, formed by mixer 1002 followed by low-pass filter 1003. Mixer 1002 multiplies the signals received on its two inputs, i.e. the electronic signal from monitoring optical receiver 905 (FIG. 8) and a reference signal at a harmonic or intermodulation tone of the pilot tone(s). The reference signal is phased by phase-shifter 1004 such that it is in phase with the harmonic to be monitored. The use of phase-shifter 1004 is optional; at low frequencies the delay in the system may be small enough such that no substantial phase-shift occurs and all the signals are in phase. The harmonics of the pilot tone signal are thus detected using well known coherent or synchronous detection techniques, for example as described by R. Higgins, "Electronics with Digital and Analog Integrated Circuits," Hall, 1983, particularly Chapter 18, Section 3.

Referring again to FIG. 8, two such synchronous harmonic detectors 907 and 908 are provided to detect the second and third harmonic or intermodulation content, respectively, in the output from monitor optical receiver 905. Second order distortion detector 907 has its reference signal at twice the fundamental frequency of the pilot tone, whereas third order distortion detector 908 has its reference signal at three time the fundamental frequency of the pilot tone.

In the embodiment of FIG. 8, the output signals of distortion detectors 907 and 908 are fed into loop processor 909 which serves to electronically process the output signals from harmonic detectors 907 and 908 (either analog, digital or mixed analog-digital processing) in order to generate several analog actuating signals which are fed to modulation driver 906.

In the simplest form of loop network the two harmonic detector signals are processed separately, however one can envision more complex versions of analog processing, wherein the two harmonic detector signals are combined to generate at least two actuating signals. In the more general case the loop network is a two-port network with cross-coupling between the inputs and outputs, i.e. each of the outputs is a function of both inputs.

The actuating signals provided by loop processor 909 parametrically tune the quiescent point bias parameters of the modulation 906 driver, which in turn assures modulating means 902 continually operates at a bias point such that the overall distortion of the system is greatly reduced or eliminated as compared with prior art systems in which a bias point is chosen and remains fixed.

When a single pilot tone is used as in FIG. 8, this pilot signal provided by pilot tone oscillator 910 can in general be any periodic signal which has null second and third harmonics such that the presence of the second and third harmonics in the optical output be uniquely associated with the degree of nonlinearity to be compensated, i.e., if one detects second or third harmonics in the output signal at the optical receiver, one knows that the harmonics are due to the combination driver-modulator, rather than originating in the pilot tone signal. Once one detects harmonics, corrections are applied to the driver to cause harmonics to disappear from the output signal of the optical receiver. It is also required that the frequency values of the (absent) second and third harmonics of the pilot tone fall within stop-bands of the information signal spectrum. For example, in one embodiment of this invention suitable for use with cable television, the fundamental frequency of the pilot tone is less than 54 MHz/3, such that the second and third harmonics of the pilot tone fall in the low-pass stopband of 0 to 54 MHz, where there are no TV channels. Another requirement is that the second and third harmonics of the pilot tone must not fall on top of the intermodulation tones generated by the information signal itself in order not to contaminate the diagnostic signal with randomly phased spurious intermodulation tones associated with the information signal.

One example of a pilot signal suitable for use with this invention when a single pilot tone is used is a pure sinusoidal tone with its second and third harmonics kept at negligible level. Other pilot tone signals including digitally generated signals, can be used consistent with the requirement that the second and third harmonics of the signal be null.

Figure 19:
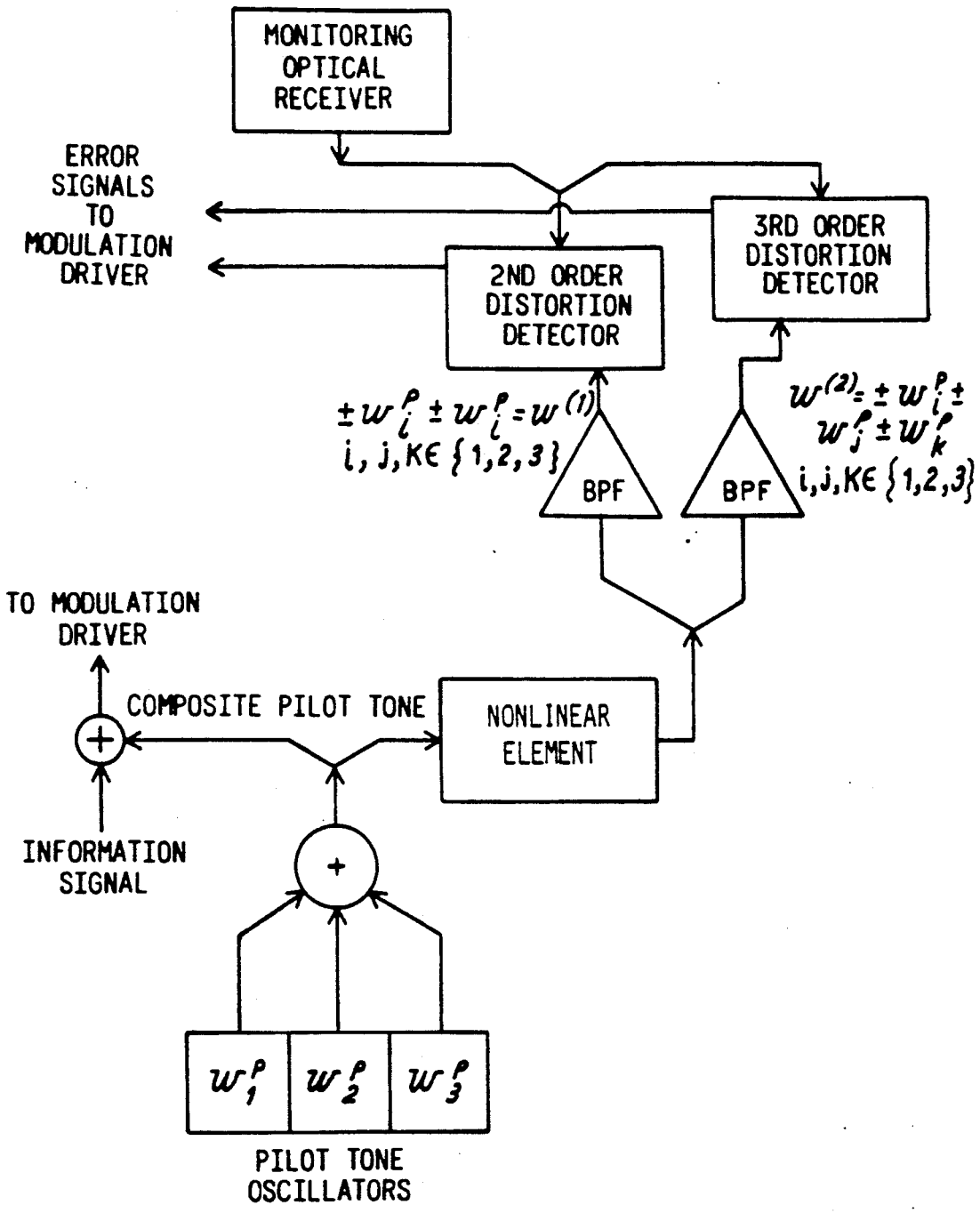
FIG. 19 is a diagram depicting one embodiment which utilizes a plurality of pilot tones.

In other embodiments, multiple pilot signals are used, allowing additional flexibility in the choice of monitoring frequencies and lifting the requirement that the second and third harmonics of the pilot tones be null. For example when two pilot tones of fundamental frequencies $f_1^p$ and $f_2^p$ (assume $f_1^p > f_2^p$) are injected with the modulation signal, the nonlinearity of the modulator driver and the modulator generates intermodulation tones at frequencies $f^{(2)} = f_1^p \pm f_2^p$. Either of these two values for $f^{(2)}$ may be used diagnostically to provide parametric feedback by detecting the presence of a tone at $f^{(2)}$ at the output of the monitoring receiver. The detection is done as before with a synchronous detector which is labeled "second-order distortion detector". The synchronous detector is also provided a reference signal at the frequency $f^{(2)}$. This reference signal may be derived from the two oscillators generating the two pilot tones by mixing those two tones in a strong non-linearity such as a mixer, and narrow-band passing the desired frequency $f^{(2)}$. Similarly an error signal proportional to the strength of the third order residual nonlinearity of the transmitter may be derived by monitoring a third order intermodulation tone generated by the two pilot tones at frequency $$f^{(3)} = 2f_1^p \pm f_2^p \text{ or}$$

$$f^{(3)} = f_1^p \pm 2f_2^p$$

by means of a synchronous detector labelled the "third-order distortion detector" in FIG. 19.

FIG. 19 shows an extension of the above concepts three pilot tones at frequencies $f_1^p$, $f_2^p$, $f_3^p$ injected into the modulation signal. The intermodulation frequencies are now $$f^{(2)} = f_i^p \pm f_j^p \pm f_k^p,$$

where the indexes i,j, and k are taken from the set {1,2,3} and where i,j, and k do not have to be distinct.

As before the two distortion detectors are provided the reference frequencies $f^{(2)}$ and $f^{(3)}$, respectively, which are derived by passing the summation of the three pilot tones through a strong non-linearity such as a diode or a mixer with its two input ports shorted and connected to the input signal.

The other output of the optical splitter (the one which does not lead to the monitoring receiver) as well as any other available outputs of the modulation means, are connected to a fiber optic or free space transmission or distribution network terminating in one or more optical receivers. It is assumed that these receivers as well as the monitoring optical receiver within the transmitter contribute an amount of harmonic distortion and intermodulation which is substantially lower than that resulting from the transmitter nonlinearity.

PREFERRED EMBODIMENT

In a preferred embodiment (FIG. 11), the loop processor 909 consists of two uncoupled low-pass filters 1101 and 1102, each connected to the second and third distortion detectors 907, 908, (FIG. 8), respectively. In an alternative embodiment, either one of filters 1101 and 1102 may be absent or included within its associated harmonic detectors 907 and/or 908.

The output signal of second order distortion monitoring filter 1101 drives the input 1103 to modulation driver 906 which is used to add a DC bias to the modulation signal applied to modulating means 902 or to directly control separate biasing electrodes on modulator means 902, in effect (ideally) nulling the amount of second order distortion present in the modulated output signal of modulating means 902 by shifting the bias point around the quadrature point.

The output signal 1104 of third order distortion monitoring detector 1102 drives a parametric input 1105 of linearizer predistortion circuit 1106, or alternatively drives gain control input 1107 of linear gain element 1108 placed after the linearizer circuit and before the modulating means 902. The parametric feedback loop actuates input 1104 to (ideally) null out the third order combined nonlinearity of the modulating driver 906 and the modulating means 902.

Odd-wave Mode of Operation

The system of FIG. 11 is easiest to understand and the overall system operates best when linearizer non-linear network 1106 has an odd-wave amplitude transfer characteristic. That is, the output y(t) amplitude vs. input amplitude x(t) of the linearizer is described by an odd (antisymmetric) function with respect to the zero-voltage point: $y(-x) = -y(x)$. A Taylor series expansion up to the third order does not then contain a second order term:

$$y(t) = \alpha_1(p)x(t) + \alpha_3(p)x^3(t) \tag{6}$$

Notice that the amount of third order nonlinearity of this circuit is parametrically controlled by a parametric electrical input (voltage or current) p, where in general the parameters $\alpha_1$ and $\alpha_3$ have different dependences on the control signal p. In order to obtain compensation of the modulator third-order nonlinearity, the sign of the third order coefficient $\alpha_3$ should be opposite that of the third order coefficient of the modulator and a certain relationship should exist between the various coefficients, such that for a particular value of the control parameter p, the third order nonlinearity of the odd-wave linearizer precisely compensates for the third-order nonlinearity of the modulator. The amount of third order nonlinearity of the odd-wave linearizer is tuned by the control circuit to precisely compensate for the third order nonlinearity of the modulator, nulling the overall third-order nonlinearity of the linearizer-modulator combination. The compensation process can be described mathematically as follows:

Assume that the modulator has been separately tuned to its quadrature point so it is also described by a Taylor series with only first and third terms (with the other terms vanishingly small):

$$z(t) = \beta_1 y(t) + \beta_3 y^3(t) \tag{7}$$

Substituting eq. 6 in eq. 7 and performing the expansion, collecting like powers, and retaining only terms of order up to the 3rd, yields:

$$z = \beta_1\alpha_1 x + (\beta_1\alpha_3 + \beta_3\alpha_1^3)x^3 \tag{8}$$

The terms in x of higher order than the third have coefficients which contain products of powers of $\beta_3$ and $\alpha_3$ (each of which terms are assumed small) and are therefore negligibly small. However the coefficient of $x^3$ in z is just small, not negligibly small (since $\beta_1$ and $\alpha_1$ are not small). It is apparent that in order to render this coefficient null requires:

$$\beta_1\alpha_3 + \beta_3\alpha_1^3 = 0 \tag{9}$$

or $$\frac{\beta_1}{\beta_3} = -\frac{\alpha_1^3(p)}{\alpha_3(p)} \tag{10}$$

Thus the sign of $\alpha_3$ being opposite that of $\beta_3$ is a necessary condition for nulling out third order distortion. For example, the modulator characteristic around its quadrature point is described by $y = \sin(x) = x - (1/6)x^3 + \ldots$. Thus, $\beta_1 = 1$ and $\beta_3 = -(1/6)$, therefore $\alpha_3$ and $\alpha_1$ should have the same sign, i.e., positive and $\alpha_3 = \alpha_1^3/6$. Furthermore, for a suitable dependence of $\alpha_1$ and $\alpha_3$ on p, one can find a solution to equation (10). The detailed parametric dependence, as determined by the nature of the nonlinear network, determines the range over which a solution can be found, if at all.

An additional degree of freedom can be provided by incorporating a linear gain element between the linearizer and the modulator of FIG. 11. In this case the describing transfer characteristics are:

$$y'(t) = \alpha_1(p)x(t) + \alpha_3(p)x^3(t) \tag{11}$$

$$y(t) = Gy'(t) \tag{12}$$

$$z(t) = \beta_1 y(t) + \beta_3 y^3(t) \tag{13}$$

It is easy to see by substitution that the nonlinear system $\beta_1$, $\beta_3$ preceded by the linear gain G, is equivalent to a nonlinear system $(G\beta_1, G^3\beta_3)$. Similarly, the nonlinear system $\alpha_1$, $\alpha_3$ followed by the linear gain G is equivalent to a nonlinear system $(G\alpha_1, G\alpha_3)$.

Arguing either way, once the gain G is inserted, the condition (eq. 10) becomes:

$$\frac{G\beta_1}{G^3\beta_3} = -\frac{\alpha_1^3(p)}{\alpha_3(p)} \tag{14}$$

$$\frac{\beta_1}{\beta_3} = \frac{G^3\alpha_1^3(p)}{G\alpha_3(p)} \tag{15}$$

Thus, the gain G may be tuned to a value which may facilitate meeting the nulling condition. More generally, another parameter p' may be used to tune this gain in addition to or in lieu of p, yielding the following null third harmonic condition $$\frac{\beta_1}{\beta_3} = -\frac{G^2(p')\alpha_1(p)}{\alpha_3(p)} \tag{16}$$

Modulator Quadrature Operation

In the discussion above it was assumed that the modulator is described by a nonlinear transfer characteristic which is odd i.e. it has no second order coefficient. This is separately achieved by the control loop which monitors the generation of second harmonic distortion and superposes a slowly varying (quasi-DC) correction term onto the modulating input signal applied to the modulator. The slowly varying actuating voltage tunes the bias point of the modulator to the point of null second harmonic distortion.

Let the modulator voltage v(t) include a pilot term $v_p \cos \omega_p t$. The result of the second order non-linearity term $\theta_b v^2(t)$ (eqs. 2,3,4) is to generate a term $\theta_b v_p^2 \cos 2w_p t$, which is down converted by multiplication with the reference frequency $v_r \cos(2w_p t + \phi_r)$, to yield a signal $\theta_b v_p^2 v_r \cos\phi_r$. By setting the phase of the reference signal to $\phi_r = 0$, one obtains a second harmonic correction signal $\theta_b v_p^2 v_r$. Notice that this correction signal is proportional to the deviation $\theta_b$ away from the wanted quadrature point and has different signs depending whether the modulator drifts on one side or the other of the null point, thus it is a good error signal for actuating feedback to null $\theta_b$, which results in elimination of the second harmonic component in the optical output. Thus, by electronically feeding back the deviation from the null point of second harmonic distortion, to affect the modulation bias point tuning, the modulator is kept locked to its quadrature point, resulting in minimization of the second order harmonic and intermodulation distortion.

Once the second harmonic correction feedback loop brings the second order distortion of the transmitter to a minimum, the next source of harmonic distortion is the third order term. To reduce this term, the non-linear predistortion circuit described in FIG. 11 provides a non-linear circuit 1106 which, combined with the non-linearity of the modulator, provides a reduced (or ideally, a null) overall third order harmonic coefficient, as explained above. The transfer characteristic of the non-linear predistortion means is designed to be as close as possible to the inverse of the non-linear characteristic of the modulating means, resulting in a partial cancellation of third order non-linearity. However, in the wake of device to device variations (both the modulator and the linearizer), temperature variations, differences in the drive voltage of the modulator, a particular fixed design of the pre-distorting nonlinearity may not work optimally and repeatably in all cases. For this reason, in the present invention the predistortion circuit is realized with a degree of freedom, namely a parametric input which controls the relative values of the fundamental to the third harmonic output, (eq. 10) or a variable gain parameter (eq. 16).

The tuning of this parametric scale factor over a limited range brings the combined driver-modulator system to a null point of third order Taylor coefficient of the transfer characteristic, cancelling in effect third order intermodulation distortion.

Odd-wave Linearizer Realization

Figure 12:
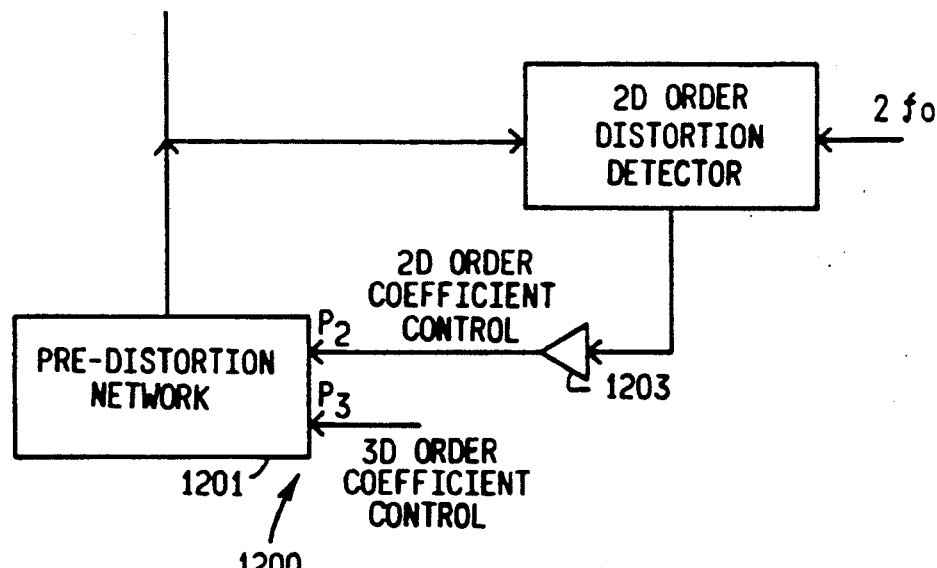
FIG. 12 is one embodiment of an odd-wave linearizer circuit suitable for use in accordance with the teachings of this invention.

An odd-wave linearizer nonlinear circuit can be designed based on a number of circuits which include nonlinear components such as diodes. Using antisymmetrical topologies, these circuits are designed to yield an ideally antisymmetric voltage or current transfer characteristic, however because of imperfections in element matching, residual even components may be present. A circuit with two degrees of freedom should be designed which has its second and third order nonlinearity separately voltage or current controlled by two separate inputs. Such circuit should be embedded in a system which acts to null out the second harmonic characteristics. A particular implementation of such a system is described below with reference to FIG. 12. The transfer characteristic of the predistortion network is given by $$y = a_1 x + a_2(p_2) x^2 + a_3(p_3) x^3, \qquad (17)$$

where
x = the input voltage;
y = the output voltage;
$p_2$ = the control parameter of the second harmonic coefficient; and
$p_3$ = the control parameter of the third harmonic coefficient.

Assuming that there is a value of the parameter $p_2$ such that $a_2(p_2)$ is zero, then it is possible to design an electronic control loop similar to the opto-electronic control loop shown in FIG. 11, sensing the output of the modulator, in order to null out the $a_2(p_2)$ coefficient. The electrical output signal of network 1201 is tapped off and a sample of the network output signal is passed to second order distortion detector 1202 which feeds back through loop filter 1203 to provide voltage $p_2$ which controls the second order distortion of linearizing circuit 1201.

The combined operation of all the control loops described above is that the last described control system makes sure that the linearizer is described by a characteristic which is entirely odd. The second harmonic monitor on the optical output brings the modulator to a null point of its second harmonic and the third harmonic monitor on the optical output brings the linearizer to an operating point where it has no second harmonic and its third order nonlinearity cancels that of the modulator. This results ideally in null overall second and third order distortion.

Limited Frequency Response Considerations

The linearizer and modulator were described in eqs. 6,7 as having a memoriless instantaneous amplitude transfer characteristic. In reality, these devices have finite bandwidths and associated frequency responses. An important point is that the phase characteristic of the frequency response should be linear in frequency to a good approximation and the magnitude roll-off of the linearizer-modulator combination should be minimized. These requirements essentially mean that special care should be taken in using high frequency components in the linearizer non-linear predistortion circuit and using a broadband modulator. The more the phase frequency deviates from linearity and the amplitude rolls-off, the less perfect is the cancellation of third harmonic distortion in the combination of linearizer and modulator. This degradation may be counteracted by introducing linear frequency compensation circuits between the linearizer and the modulator, such that the overall frequency response is flat in magnitude and has constant group delay (linear phase) to a good approximation.

The linearizer predistortion network may be modeled as a memoriless instantaneous non-linearity of amplitude transfer characteristic described by $$y'(t) = a_1 x(t) + a_3 x^3(t) \qquad (18)$$

followed by a linear finite memory system of transfer function H(w), and impulse response h(t):

$$y(t) = h(t) * y'(t) \qquad (19)$$

where * denotes convolution.

The linearizer feeds into the modulator which is described by a memoriless transfer characteristic $$z(t) = \beta_1 y(t) + \beta_3 y^3(t) \qquad (20)$$

(in fact, the linear frequency response of the modulator and of the modulator driver are absorbed in the transfer function H(w) assigned to the linearizer).

Let the input contain the complex sinusoids $e^{\pm jw_k t}$, $e^{\pm jw_m t}$, $e^{\pm jw_n t}$, and then the output y'(t) of the first non-linearity (eq. 18) contains the term $$a_3 e^{j[\pm w_k \pm jw_m \pm w_n]}$$

as well as the original terms $$a_1 e^{\pm jw_k t},$$

$$a_1 e^{\pm jw_m t},$$

$$a_1 e^{\pm jw_n t}.$$

The frequencies k,m,n may or may not be distinct. At the output of the linear filter the various complex exponentials get multiplied by the complex transfer function H(w), i.e., get modified in amplitude and attenuated in phase: The intermodulation term evolves out of the linear filter as $$\alpha_3 H(\pm w_k \pm w_m \pm w_n) e^{j[\pm w_k \pm w_m \pm w_n]}$$

while the direct modulation terms come out as $$\alpha_1 H(\pm w_k) e^{\pm j w_k t},$$

$$\alpha_1 H(\pm w_m) e^{\pm j w_m t},$$

$$\alpha_1 H(\pm w_n) e^{\pm j w_n t}.$$

Finally, both the intermodulation and direct modulation terms hit the non-linearity of the modulator. The intermodulation term transparently passes through the linear part of the modulator non-linearity yielding a component:

$$\beta_1 \alpha_3 H(\pm w_k \pm w_m \pm w_n) e^{j[\pm w_k \pm w_m \pm w_n]} \quad (21)$$

The direct modulation terms interact with the non-linearity of the modulator to generate intermodulation terms:

$$\alpha_1{}^3 \beta_3 H(\pm w_k) H(\pm w_m) H(\pm w_n) e^{j[\pm w_k \pm w_m \pm w_n]} \quad (22)$$

The total intermodulation term at the output of the modulator is the superposition of the two intermodulation terms generated in the linearizer and modulator respectively:

$$[\beta_1 \alpha_3 H(\pm w_k \pm w_m \pm w_n) + \alpha_1{}^3 \beta_3 H(\pm w_k) H(\pm w_m) H(\pm w_n)] e^{j[\pm w_k \pm j w_m \pm w_n]} \quad (23)$$

In order for this term to cancel, the term in brackets needs to vanish:

$$\beta_1 \alpha_3 H(\pm w_k \pm w_m \pm w_n) + \alpha_1{}^3 \beta_3 H(\pm w_k) H(\pm w_m) H(\pm w_n) = 0 \quad (24)$$

This nulling condition is a generalization of the static (low frequency) memoryless analysis (eq. 9) whereby the condition for cancellation of third-harmonic was found to be:

$$\beta_1 \alpha_3 + \alpha_1{}^3 \beta_3 = 0 \quad (25)$$

Breaking $H(w) = A(w) e^{j\phi(w)}$ into its amplitude and phase, the total complex amplitude of the total intermodulation distortion term is written as:

$$\beta_1 \alpha_3 A(\pm w_k \pm w_m \pm w_n) e^{j\phi[\pm w_k \pm w_m \pm w_n]} + \alpha_1{}^3 \beta_3 A(\pm w_k) A(\pm w_m) A(\pm w_n) e^{j[\phi[\pm w_k] + \phi[\pm w_m] + \phi[\pm w_n]]} = 0 \quad (26)$$

A sufficient condition for the vanishing of this expression is that $\phi[w]$ be linear in w $$\phi(w) = T_g w \quad (27)$$

over the range $w_k + w_m + w_n$, yielding $$\phi[\pm w_k \pm w_m \pm w_n] = \phi[\pm w_k] + \phi[\pm w_m] + \phi[\pm w_n] \quad (28)$$

and allowing the simplification of the equation to $$\beta_1 \alpha_3 A(\pm w_k \pm w_m \pm w_n) = -\alpha_1{}^3 \beta_3 A(\pm w_k) A(\pm w_m) A(\pm w_n) \quad (29)$$

If the amplitude response is essentially constant over the range $w_k + w_m + w_n$, $A(w) = G$, the condition for the intermodulation distortion nulling is $$\beta_1 \alpha_3 + \alpha_1{}^3 \beta_3 G^2 = 0 \quad (30)$$

which is identical to the condition found for the memoriless case in eq. 16.

Thus, the condition for broadband cancellation of non-linearity is the constancy of the amplitude frequency response over frequency as well as constancy of the group delay which is defined as the derivative of the phase response with respect to frequency:

$$T_g(w) = d\phi/dw$$

It is apparent that the condition of eq. 27 means that $T_g$ is constant over frequency. To achieve this condition, one needs to use a modulator and linearizing circuit which have broad frequency responses, ideally much broader than the bandwidth of the information signal, such that the roll-off of the amplitude and group delay over frequency is negligible over the bandwidth of the information signal.

The pre-distortion circuit is preferably realized by using an integrated electronics high frequency fabrication process which allows a high value of the frequency cut-off of the circuit elements. In practice the frequency response requirements are difficult to meet for state-of-the-art travelling wave modulators which exhibit a fairly constant group delay but may roll off in magnitude of the order of 1 dB over 1 GHz when designed for low drive voltage.

What is further taught by this invention is the use of linear frequency compensation or equalization by inserting a linear filter between the modulator and the linearizer such that its frequency response when combined with the other frequency responses present in the system (that of the modulator and of the pre-distortion network) yields a net frequency response that is flatter in amplitude and group delay over frequency than the original system was in the absence of this compensating filter.

While the concept of frequency equalization is well known in electronics, the particular context in which the application of such linear equalization network is taught is that of the novel analysis of eqs. 24–30 which highlights the significance of the linear frequency response when dealing with the cancellation of non-linearities arising in optical transmission.

The equalization should typically be realized by a high-pass or a band-pass filter which in the case of travelling wave LiNbO$_3$ modulators should provide an increase in amplitude in frequency while substantially providing linear phase (constant group delay) over the bandwidth of the information signal since the modulator response typically has constant group delay to start with as does the response of a linearizer predistortion network realized as an IC with a frequency cut-off substantially higher than the information bandwidth.

In terms of the structure of the modulator driver, the linear frequency equalization may be combined with tunable gain element 1108 (FIG. 11).

More Generalized Operation of Linearizer with Residual Even-wave Component

If the linearizer is not precisely odd-wave, there is an even second order residual coefficient $\alpha_2$. If no measures are taken to null out this coefficient, it turns out that the system as described above may still work over a range of parameters. In this case, the second-order harmonic monitoring loop is feeding back to the modulator but it now no longer brings the modulator to the quadrature point. It rather acts to null out the second order characteristics of the whole system—modulator plus linearizer by bringing the modulator to an operating point slightly off quadrature such that the residual second order distortion of the modulator cancels that of the linearizer circuit.

The presence of an additional second order coefficient term in the two Taylor series describing the modulator and the linearizer further causes the generation of an additional contribution to the third order distortion (caused by the mixing of the terms $\alpha_1 x$ and $\alpha_3 x$ through the second order term $\beta_2 y^2$ of the modulator). Working out the math, $$y = \alpha_1 x + \alpha_2 x^2 + \alpha_3 x^3 \tag{31}$$

$$z = \beta_1 y + \beta_2 y^2 + \beta_3 y^3 \tag{32}$$

Thus, $$z = \beta_1 \alpha_1 x + (\beta_1 \alpha_2 + \beta_2 \alpha_1^2) x^2 + (\beta_1 \alpha_3 + \beta_3 \alpha_1^3 + 2\alpha_1 \alpha_2 \beta_2) x^3 + \text{higher order terms} \tag{33}$$

The nulling condition for the second order term $x^2$ is $$\beta_1 \alpha_2 + \beta_2 \alpha_1^2 = 0 \tag{34}$$

and the nulling condition for the third order term is $$\beta_1 \alpha_3 + \beta_3 \alpha_1^3 + 2\alpha_1 \alpha_2 \beta_2 = 0 \tag{35}$$

The second order term nulling condition may be written $$\frac{\beta_1(q)}{\beta_2(q)} = -\frac{\alpha_1^2(p_2)}{\alpha_2(p_2)} \tag{36}$$

where q is the biasing control parameter of the modulator around its quadrature point.

By tuning the second order coefficients via the parameters q and $p_2$, one can null the second order contribution. In fact, the tuning may be done mainly or exclusively by means of the parameter q which controls the quadrature point of the modulator, i.e. q mainly affects $\beta_2$ and to a very small extent (for small deviations around quadrature) the linear gain $\beta_1$. Alternatively, this tuning may be performed or facilitated by means of a linear gain G which is inserted between the linearizer and the modulator. It is easy to see that a system ($\alpha_1$, $\alpha_2$, $\alpha_3$) followed by a gain G is equivalent to a system (G$\alpha_1$, G$\alpha_2$, G$\alpha_3$). Similarly a system $\beta_1$, $\beta_2$, $\beta_3$ preceded by a gain G is equivalent to a system (G$\beta_1$, $G^2\beta_2$, $G^3\beta_3$).

The second order term nulling condition then becomes $$\frac{\beta_1}{\beta_2} = -\frac{G^2(p'_2)\alpha_1^2(p_2)}{G(p'_2)\alpha_2(p_2)} \tag{37}$$

If the third term in eq. 37 is negligible, in case the combined product of the second order nonlinearities $\alpha_2\beta_2$ is negligible, the third order nulling condition becomes identical to the one discussed before in the odd-wave case (eq. 37 reduces to eq. 9). In general, soluble operating ranges can be more readily attained for the third order nulling condition by tuning the gain G to an appropriate value, which changes the nulling condition to $$\beta_1\alpha_3 G + \beta_3\alpha_1^3 G^3 + 2\alpha_1\alpha_2\beta_2 G^2 = 0 \tag{38}$$

or $$\beta_3\alpha_1^3 G^2 + 2\alpha_1\alpha_2\beta_2 G + \beta_1\alpha_3 = 0 \tag{39}$$

given the condition $$\alpha_1^2\alpha_2^2\beta_2^2 - \beta_3\alpha_1^3\beta_1\alpha_3 > 0 \tag{40}$$

a solution G exists for eq. (39).

It is apparent that in the presence of the second order terms in the linearizer, the two loops still operate quite independently to null out the second and third harmonics of the whole systems although contributions of the second order terms affect the balancing of third order terms.

Circuit Realizations of Predistortion Networks

The linearizer system included in the modulation driver is based on non-linear circuits or networks that should be tunable around the quiescent point where the second order Taylor series coefficients null out. These non-linear circuits should also have tunable third order coefficients (to be tuned by parametric feedback to such values as to cancel out the third-order coefficient of the modulator). Such tunabilities are the basis for the parametric feedback techniques outlined in this invention, in the wake of device to device variations and device drifts over time, temperature, optical power and the like.

This section addresses some general principles for realizing such predistortion circuits and presents some specific embodiments.

Figure 13A:
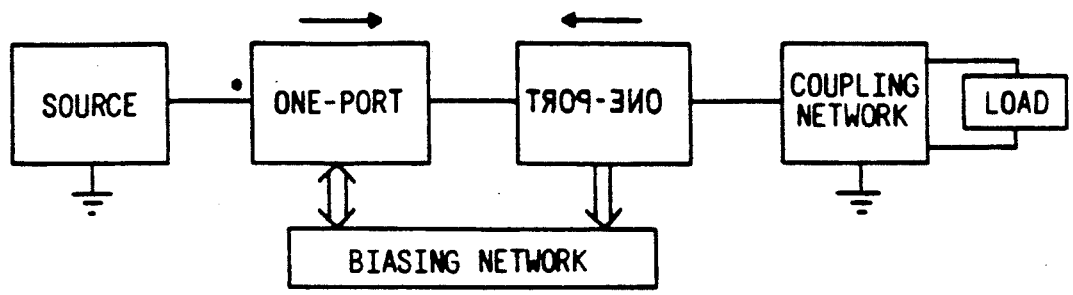
FIGS. 13a, 13b, and 13c describe three embodiments of this invention utilizing predistortion networks.
Figure 13B:
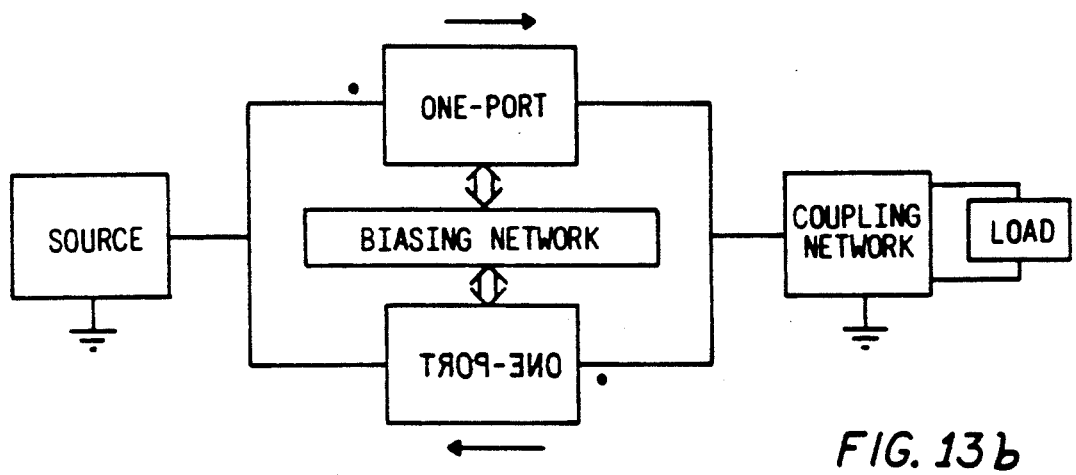
Figure 13C:
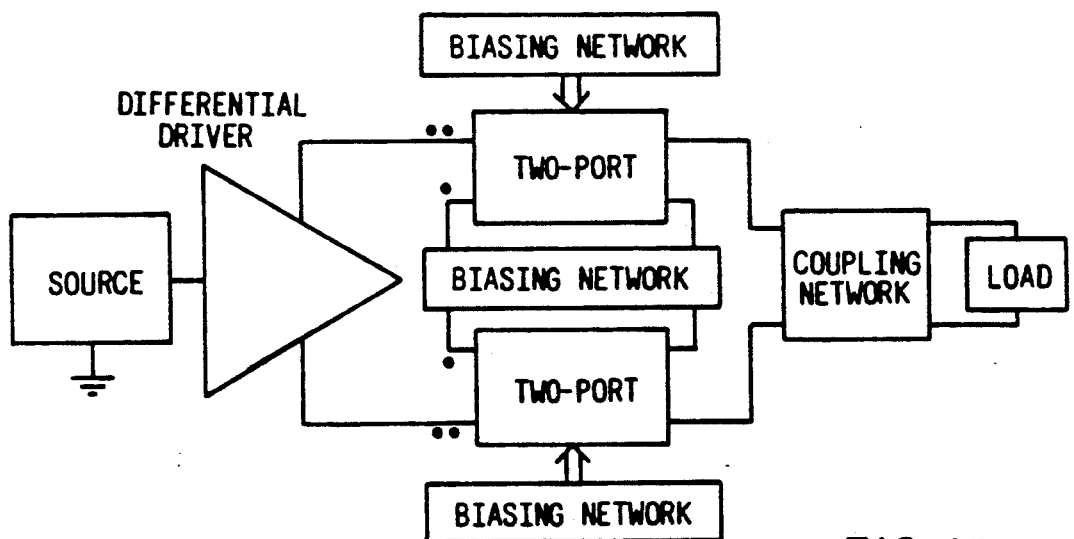

In general, one designs a predistortion network nominally odd-wave, i.e., the predistortion network should ideally have an odd-wave characteristic (the output should be an anti-symmetric (odd) function of the input). Such a network may be realized using (anti-)symmetric circuit topologies in which two essentially identical sub-networks which are mirror images of each other are combined in certain ways in order to generate the odd-wave characteristic by superposition. Three separate embodiments are described as shown in FIGS. 13a, 13b, and 13c.

a. In the first embodiment (FIG. 13a) two nominally identical one-ports are connected in series, inverted with respect to each other between the source and the load (the load may be preceded by a coupling network).

b. In the second embodiment (FIG. 13b) two nominally identical one-ports are connected parallel, inverted with respect to each other between source and the load.

c. In the third embodiment (FIG. 13c) two nominally identical two-ports are connected in a symmetric arrangement such that congruent inputs are connected to the two complementary outputs of a differential driver (which provides opposing polarities on its two outputs) and the output is also taken differentially between congruent output ports.

In each case, the two "half-networks" are assumed nominally (i.e., ideally) matched but due to device variations and drifts slight differences may result in their characteristics. In the wake of mismatch between the half-networks, one can still recover an overall odd-wave characteristic for the whole system by slightly detuning of the biasing networks away from the nominally identical quiescent points.

Inverted One-ports in Parallel

The following mathematical description applies for example to embodiment (FIG. 13b) which is taken by way of illustration. The other two embodiments may be similarly analyzed.

Figure 14:
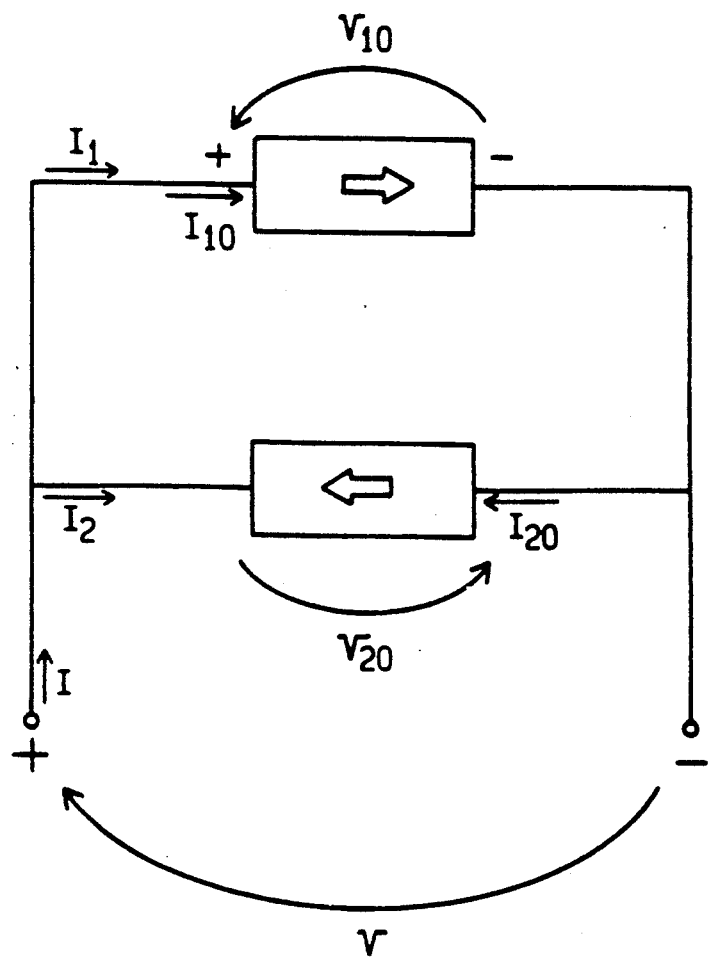
FIG. 14 is a model useful for analyzing the embodiment of FIG. 13c.

The total current through the parallel combination of one-ports (FIG. 14) is $$I = I_1 + I_2 \tag{41}$$

and the voltage on each of the two parallel one-ports is $$V = V_{10} - V_{20} \tag{42}$$

where $V_{10}$ and $V_{20}$ are the one-port voltages referred to a reference frame rigidly connected to the one-ports. Similarly, the currents in the reference frames of the one-ports are given by $I_{10}$ and $I_{20}$ such that $$I_1 = I_{10} \tag{43}$$

and $$I_2 = -I_{20} \tag{44}$$

because of the inverted topology.

The total current is then given by $$I = I_{10}(V) - I_{20}(-V) \tag{45}$$

If the devices are matched, i.e., if they have identical characteristics, $$I_{10}(\bullet) = I_{20}(\bullet) \equiv I_0(\ ) \tag{46}$$

eq. 45 becomes:

$$I(V) = I_0(V) - I_0(-V) \tag{47}$$

Notice that this is an odd-wave characteristic $$I(-V) = I_0(-V) - I_0(V) = -I(V) \tag{48}$$

In terms of Taylor series, let the two devices be described by $$I_{10}(V) = a_1 V + a_2 V^2 + a_3 V^3 \tag{49}$$

and $$I_{10}(V) = a'_1 V + a'_2 V^2 + a'_3 V^3 \tag{50}$$

Then $$I(V) = I_{10}(V) - I_{20}(-V) = (a_1 + a'_1)V + (a_2 - a'_2)V^2 + (a_3 + a'_3)V^3 \tag{51}$$

If the $a$ coefficients are equal to the $a'$ coefficients then it is apparent that the second order coefficient of I(V) vanishes. However, even if the two one-ports are not precisely matched, it is still possible to vary control biasing parameters $p_2$ and $p'_2$, such that the following odd-wave condition is satisfied $$g_2 = a_2(p_2) - a'_2(p'_2) = 0 \tag{52}$$

leading to vanishing second order coefficient. (odd-wave condition). Another way of nulling out the small residual second order coefficient is by shifting the bias point of the applied voltage V as follows: Let us compactly rewrite eq. 51 as $$I(V) = g_1 V + g_2 V^2 + g_3 V^3 \tag{53}$$

where $g_2$ is given by eq. 52

Now, substituting $V - \Delta$ for V and expanding yields $$I(V-\Delta) = g_3 V^3 + [g_2 - 3g_3\Delta]V^2 + [g_1 + 3g_3\Delta^2 - 2g_2\Delta]V + [g_1\Delta + g_2\Delta^2 + g_3\Delta^3] \tag{54}$$

It is apparent that the coefficient $[g_2 - 3g_3\Delta]$ of $V^2$ may be nulled out by a choice of bias deviation $$\Delta = \frac{g_2}{3g_3} \tag{55}$$

leading to an odd-wave characteristic.

If the output is not connected across a virtual ground point (i.e., if it does not see zero-output impedance) and if the source has a finite impedance then the applied voltage is not equal to the voltage across the parallel connection of one-ports and the analysis gets slightly more complicated as the voltage drops across the source and load impedances have to be taken into account but the conclusions are essentially the same.

Inverted Diode Pair Embodiment

Figure 15:
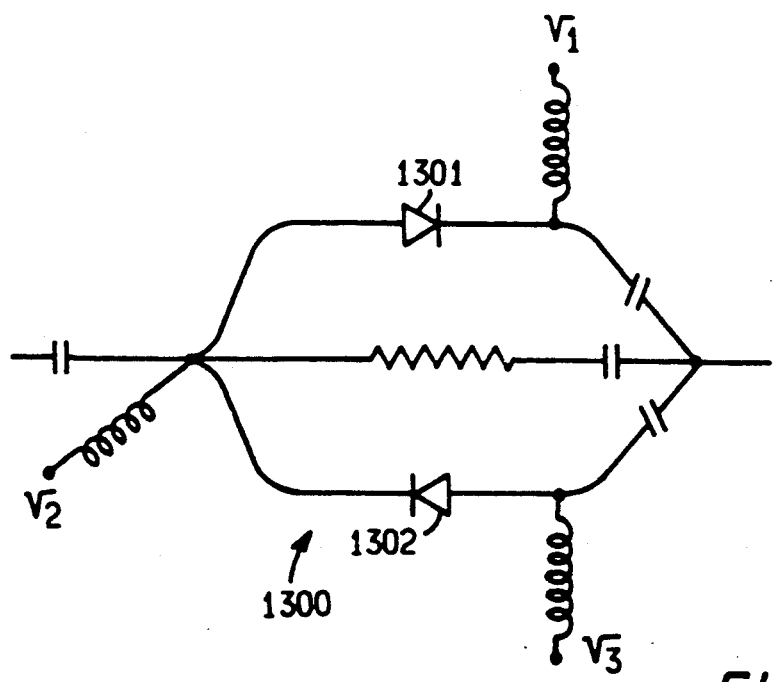
FIG. 15 is a schematic diagram of one embodiment of a circuit suitable for use as the embodiment of FIG. 13b.

As an example of the embodiment of FIG. 13b consider taking each of the one-ports to consist of a diode in parallel with a resistor. The resulting network can be simplified (by combining the two resistors in parallel) to that of FIG. 15. The capacitors and the inductors are added for biasing purposes to block the DC and AC currents respectively. The circuit is controlled by the three biasing voltages $V_1$, $V_2$, $V_3$. In particular $V_3$ may be grounded, in which case the system is controlled by $V_1$ and $V_2$. If the diodes are matched the biasing condition for the removal of second harmonic is $V_2 = \frac{1}{2}(V_1 + V_3)$. If the diodes are not matched, detuning $V_2$ away from the midpoint between $V_1$ and $V_3$ cancels the second order coefficient, and tuning $V_1 - V_3$ tunes the third order coefficient.

Notice that the resistor provides a linear path for the signal, providing a sizable $g_1$ coefficient, while the diodes yield a small non-linear perturbation of an otherwise linear characteristic.

Assuming matched devices, the I-V characteristic of each diode-resistor one-port is given by $I_0(V) = I^{sat}e^{V/vT} + V/(2R)$, with $V_T = kt/q$, therefore the combined characteristic is given by $$I(V) = I_0(V) - I_0(-V) = 2I^{sat} \sinh\left(\frac{V}{V_T}\right) + \frac{V}{R} \quad (56)$$

If the diodes are not matched, $I_1^{sat} \neq I_2^{sat}$. Let $I_1^{sat} - I_2^{sat} = 2I_\Delta$, $\bar{I}^{sat} = \frac{1}{2}(I_1^{sat} + I_2^{sat})$ and $\bar{V} = \frac{1}{2}(V_1 + V_3)$ and express the imbalance in bias voltages on the diodes in terms of $V_\Delta$, the deviation away from the midpoint:

$$V_1 - V_2 = \bar{V} + V_\Delta \quad (57)$$

and $$V_2 - V_3 = \bar{V} - V_\Delta \quad (58)$$

In this case the combined characteristic may be shown to be $$I(V) = 2e^{V/V_T}\left[\bar{I}^{sat}\sinh\left(\frac{V + V_\Delta}{V_T}\right) + I_\Delta\cosh\left(\frac{V + V_\Delta}{V_T}\right)\right] \quad (59)$$

Notice that if $V_\Delta = 0$ the sinh is antisymmetric and the cosh is symmetric, i.e., it contributes even components, however by tuning $V_\Delta \neq 0$ (achieved by tuning the voltage $V_2$) the system may be brought to antisymmetry as explained above in eqs. 54 and 55.

Differentially Driven Matched Two-ports Embodiment

Figure 16:
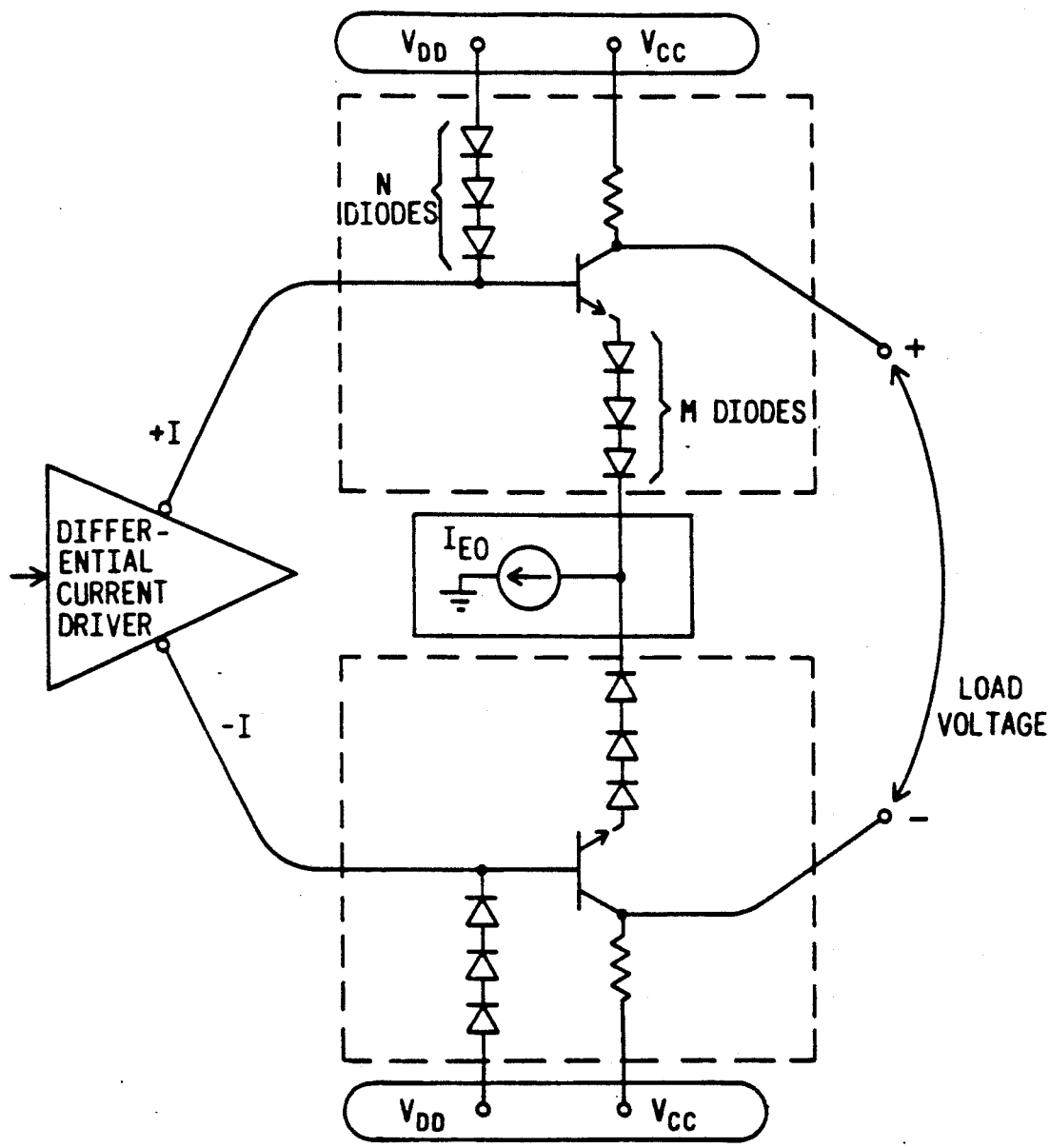
FIG. 16 is an embodiment of the topology of FIG. 13c.

As an example of the embodiment of FIG. 13c consider the circuit of FIG. 16 with N diodes connected to the base of the bipolar transistor and with M−1 diodes connected to the emitter (M diodes counting the emitter diode).

Figure 17:
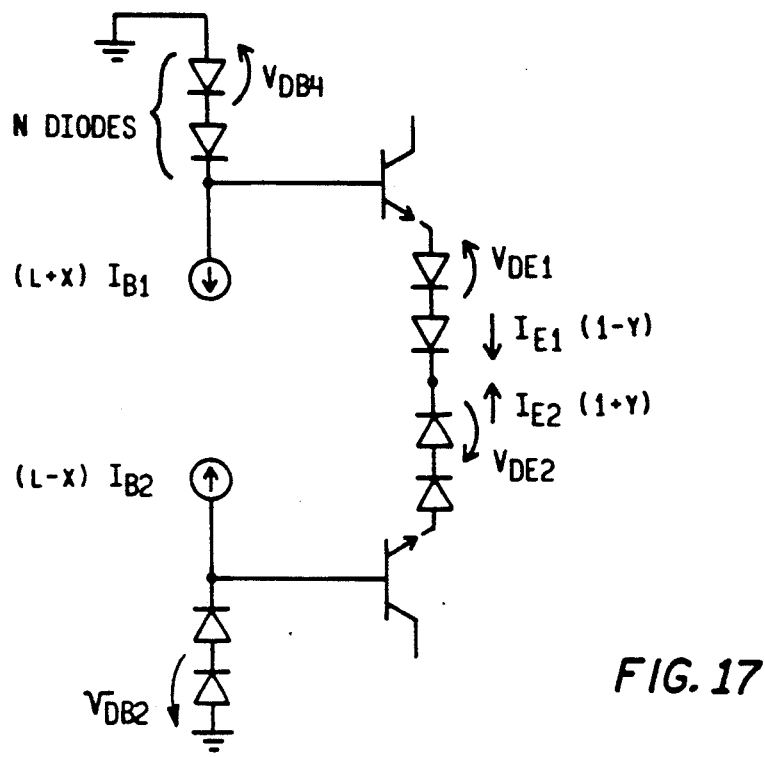
FIG. 17 is a model of the circuit of FIG. 16 useful for analysis.

An analysis of the circuit of FIG. 16 shown in the model of FIG. 17.

The differentially driven currents sinking the bases are expressed as $I_{B1}(1+x)$ and $I_{B2}(1-Sx)$ where x is the normalized input to the differential driver. Notice that this notation allows for different quiescent current $I_{B1}$ and $I_{B2}$ when x=0 and for unbalanced gains of the two differential arms (S≠1). Similarly the output emitter currents are written as $I_{E1}(1-y)$ and $I_{E2}(1+Ry)$. In this case due to Kirchoff's current law (sum of two currents equal to the constant current sinked by the common emitter source) one has $$R = \frac{I_{E1}}{I_{E2}} \quad (60)$$

The sum of all diode drops through the 2N+2M diodes should be zero:

$$NV_{DB1} + MV_{DE1} - MV_{DE2} - NV_{DB2} = 0 \quad (61)$$

The V-I characteristic for a diode is $$V = \frac{kT}{q}\ln\frac{I}{I^{sat}} \quad (62)$$

Substituting eq. 62 in eq. 61 yields $$N\ln\frac{I_{B1}(1+x)}{I_{B1}^{sat}} + M\ln\frac{I_{E1}(1-y)}{I_{E1}^{sat}} = \quad (63)$$

-continued
$$N\ln\frac{I_{B2}(1-Sx)}{I_{B2}^{sat}} + M\ln\frac{I_{E2}(1+Ry)}{I_{E2}^{sat}}$$

This may be further expressed as $$\left(\frac{I_{B1}}{I_{B1}^{sat}}\right)^N \left(\frac{I_{E1}}{I_{E1}^{sat}}\right)^M (1+x)^N(1-y)^M = \quad (64)$$

$$\left(\frac{I_{B2}}{I_{B2}^{sat}}\right)^N \left(\frac{I_{E2}}{I_{E2}^{sat}}\right)^M (1-Sx)^N(1+Ry)^M$$

Raising eq. 64 to the power 1/M and defining $N/M = \sigma$ yields:

$$F\left(\frac{1+x}{1-Sx}\right)^\sigma = \left(\frac{1+Ry}{1-y}\right) \quad (65)$$

with $$F = \left(\frac{I_{B1}/I_{B2}}{I_{B1}^{sat}/I_{B2}^{sat}}\right)^\sigma \left(\frac{I_{E1}/I_{E2}}{I_{E1}^{sat}/I_{E2}^{sat}}\right) \quad (66)$$

Solving for y:

$$y = \frac{F\left(\frac{1+x}{1-Sx}\right)^\sigma - 1}{F\left(\frac{1+x}{1-Sx}\right)^\sigma + R} \quad (67)$$

If R=1=S $$y = \frac{F(1+x)^\sigma - (1-x)^\sigma}{F(1+x)^\sigma + (1-x)^\sigma} \quad (68)$$

If, additionally, F=1

$$y = \frac{(1+x)^\sigma - (1-x)^\sigma}{(1+x)^\sigma + (1-x)^\sigma} \quad (69)$$

Notice that in this case there is odd wave symmetry: $y(-x) = -y(x)$. If further $\sigma = 1$ then $y = x$ and we get a linear characteristic.

If R=1=S and F≠1 there is an even part to y(x).

Figure 18A:
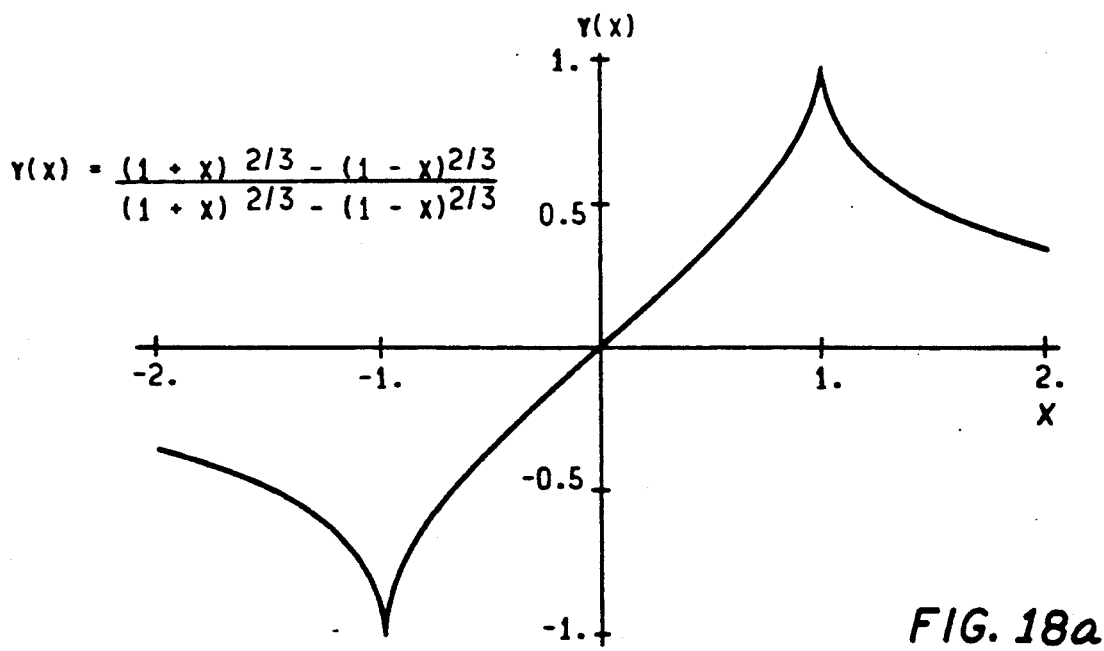
FIGS. 18a, 18b, and 18c are graphs depicting the odd-wave transfer characteristic of equation 69.
Figure 18B:
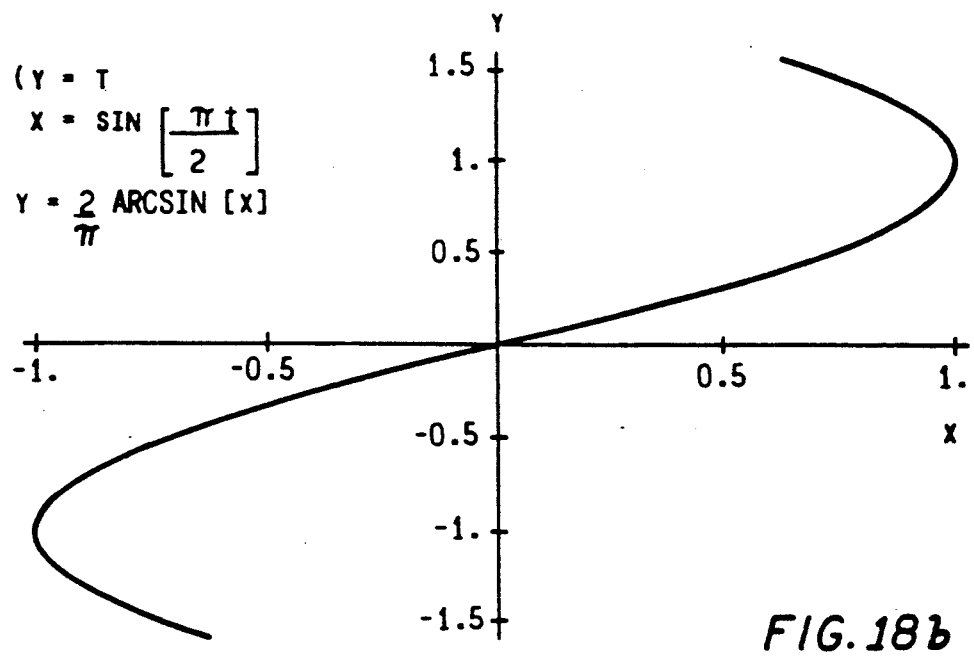
Figure 18C:
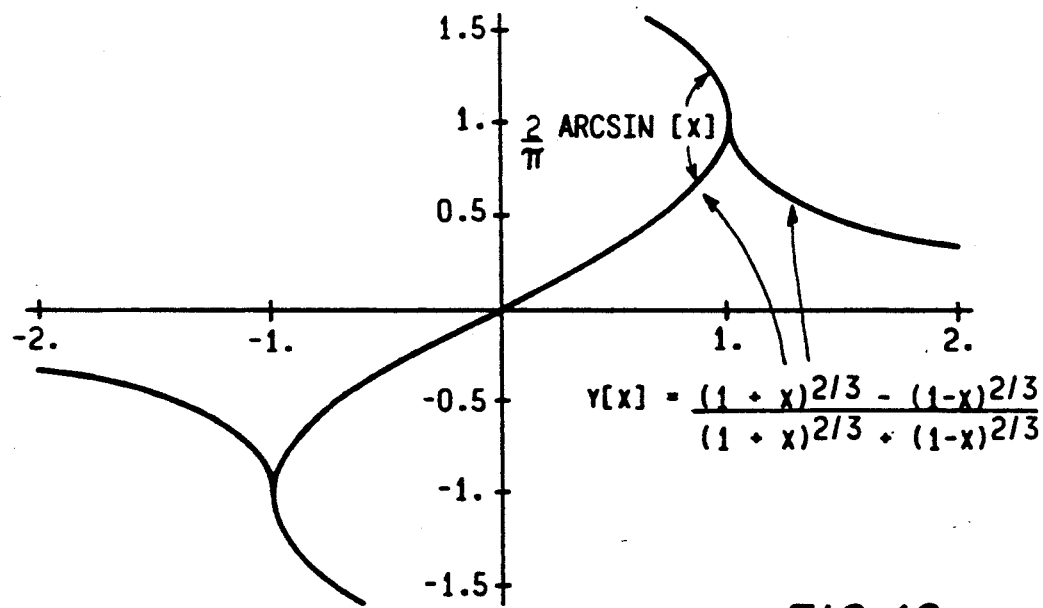

The odd-wave transfer characteristic of eq. 69 is described in FIG. 18a for $\sigma = \frac{2}{3}$ as obtained for N=2 and M=3. FIG. 18b plots an arcsin(x) characteristic which in a memoriless system would provide perfect compensation of the sin(x) modulator non-linearity: sin(arcsin(x))=x. Some suitable scaling factors are also provided. It is apparent that eq. 69 provides a good approximation to the ideal arcsin(x) characteristic.

Notice that because of the excellent overall matching of the two characteristics, whenever the parametric feedback system nulls out the third order harmonic distortion, it will automatically, for the same values of the tuning parameters also provide nulling of higher orders of nonlinearity, e.g. the 5th and 7th order.

Further Applications and Generalizations

The claimed invention may be further generalized to cover higher than third order terms by including harmonic detectors to monitor the higher order harmonics and intermodulation tones and feeding to control parameters which affect the relative magnitudes of higher order coefficients.

Another application of the claimed invention is to systems which use direct modulation of the light source rather than external modulation. In this case the description above literally applies for direct modulation around an inflection point of the light vs. current characteristic of a laser source. If no such operating point can be found then the mode of operation described in the last section applies, with the linearizer detuned away from the odd-wave operating point in such a way that the second order term of the linearizer nulls out the second order term of the laser (in the external modulation case, the modulator was tuned so as to null out the linearizer, here the cause-effect roles of linearizer and optical source are reversed but the mathematics is the same).

The described methods of linearization of broadband systems apply not only to analog signal transmission and distribution, but also to digital transmission as well as to mixed modes of transmission combining digital and analog techniques, such as subcarrier multiplexing in which case digital channels are combined by analog frequency division multiplexing. In general the transmission of digital signals is less prone to the degrading effects of nonlinearities, thus the linearization techniques of this invention will be of particular importance to special cases, for example:

1. Digital spread spectrum transmission which is very sensitive to the degradation of the phase response due to the non-linearity of the transmission channel.

2. Sub-carrier multiplexed methods, whereby a large number of digital channels are combined by analog frequency division multiplexing.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. An optical transmission or distribution system for broadband signals comprising:
   an optical transmitter for providing transmitted optical power comprising:
      a light source;
      an electrical-to-light modulation means for modulating said light having a first non-linear modulation transfer characteristic having an associated shape, there being a bias point on said characteristic, said modulation means including an information signal input for receiving an electrical modulation signal, an output for providing a modulated signal, and means for adjusting said modulation means;
   one or more optical receivers;
   a fiber optic distribution network for receiving said modulated light and distributing said modulated light to said optical receivers; and
   a parametric feedback system comprising:
      means coupled to said modulation means to superpose one or more pilot signals upon said electrical modulation signal;
      preconditioning means coupled to said modulation means for providing electronic pre-conditioning of said electrical modulation signal, comprising:
         means for providing non-linear predistortion to said modulation signal, having a second non-linear transfer characteristic; and
         means to adjust said second non-linear transfer characteristic of said pre-conditioning means;
      a monitoring optical receiver;
      means to route a portion of modulated light to said monitoring optical receiver;
      means coupled to said monitoring optical receiver to generate error signals indicative of the deviations of the system away from optimum points of minimal harmonic distortion and intermodulation associated with said system, by monitoring the amounts of distortion generated by interaction of said pilot signals with the overall nonlinearity of said optical transmitter;
      means to electronically process said error signals to provide processed error signals; and
      means to feed back said processed error signals to said means for providing electronic pre-conditioning in order to adjust the overall transfer characteristic of said means for providing electronic pre-conditioning and said modulation means such that the harmonic distortion and intermodulation components in the spectrum of the modulated signal at the output of said optical transmitter are reduced.

2. An optical transmission or distribution system as in claim 1 wherein said electrical-to-light modulation means comprises a continuous wave laser and an external integrated optic electro-optic modulator with one optical input and at least one optical output.

3. An optical transmission or distribution system as in claim 2 wherein said external integrated optic modulator is selected from the group of devices consisting of an integrated optic Mach-Zehnder interferometer, a directional coupler, a 1×2 balanced bridge interferometer, and a 2×2 balanced bridge interferometer.

4. An optical transmission or distribution system as in claim 1 wherein said light source and said modulation means comprise a directly modulated laser.

5. An optical transmission or distribution system as in claims 2, 3, or 4 wherein said means for adjusting said modulation of said modulation means comprises an electronic circuit which additively superposes a varying biasing signal upon said information signal.

6. An optical transmission or distribution system as in claims 2 or 3 wherein said means for adjusting said modulation of said modulator comprises an electrode structure on said modulator, electrically isolated from a broadband modulation electrode structure and connected to an electrical biasing means separate from said information signal input of said modulation means.

7. An optical transmission or distribution system as in claims 1, 2, 3, or 4 wherein said pilot signals are chosen such that the spectrum of selected distortion components which are generated by said pilot signals in said system, is disjoint in frequency from the spectrum of said electrical modulation signal, and is disjoint in frequency from the spectrum of the distortion components generated by said information signal.

8. An optical transmission or distribution system as in claim 7 wherein only one pilot signal is used, which has second and third harmonics before it is superposed on said electrical modulation signal which are sufficiently low such that they cannot be detected by said means to generate error signals.

9. An optical transmission or distribution system as in claim 7 wherein at least two pilot signals are used such that at least one of the second order and third order intermodulation products generated by said pilot signals in the presence of overall nonlinearity are disjoint in frequency from the spectrum of said electrical modulation signal or the spectrum of intermodulation and harmonic distortion components generated by said electrical modulation signal.

10. An optical transmission or distribution system as in claims 1, 2, 3, or 4 wherein said means for providing non-linear pre-distortion comprises an odd-wave non-linear electrical network that nominally has an odd-wave transfer characteristic and comprising a parametric adjusting input used to adjust the third order Taylor coefficient of the transfer characteristic of said means for providing non-linear pre-distortion.

11. An optical transmission or distribution system as in claim 10 wherein said odd-wave non-linear network comprises two nominally identical networks symmetrically or antisymmetrically inter-connected and connected to biasing networks.

12. An optical transmission or distribution system as in claim 11 wherein said means for providing non-linear pre-distortion comprises biasing means to modify the shape of the transfer characteristic or the magnitudes of at least one of the first three Taylor series coefficients of said two nominally identical networks such that a set of biasing conditions may be established where the resulting overall transfer characteristic is odd-wave regardless of whether said two networks are precisely matched to each other.

13. An optical transmission or distribution system as in claim 12 wherein said biasing means is used to adjust the even-wave components of the said means for providing non-linear pre-distortion by adjusting the operating points of said two networks in order to reduce even-order distortion.

14. An optical transmission or distribution system as in claim 12 wherein said means for providing non-linear pre-distortion attains an odd-wave transfer characteristic by a second electronic parametric feedback system comprising:
means for detecting the presence of second order distortion, namely second harmonic or second order intermodulation products of said pilot signals at the electronic output of said preconditioning means; and
means to feed back the output of said means for detecting the presence of second order distortion to said biasing means in order to reduce or substantially null out the second order at the output of the pre-conditioning means, resulting in a substantially odd wave characteristic.

15. An optical transmission or distribution system as in claim 11 wherein said odd-wave nonlinear network comprises two nominally identical one-port networks inverted with respect to each other and electrically coupled in series with each other.

16. An optical transmission or distribution system as in claim 15 wherein said one-port networks each comprise a parallel connection of a diode and a resistor and means for biasing said diodes in their active regions of operation.

17. An optical transmission or distribution system as in claim 16 wherein said means for biasing comprises means for providing a first current through said diodes to adjust the third order Taylor series coefficient and means for providing a second current through one of said diodes to adjust the second order Taylor coefficient.

18. An optical transmission or distribution system as in claim 11 wherein said odd-wave nonlinear network comprises two nominally identical one-port networks inverted with respect to each other and coupled in parallel with each other.

19. An optical transmission or distribution system as in claim 18 wherein said one-port networks each comprise a parallel connection of a diode and a resistor and means for biasing said diodes in their active regions of operation.

20. An optical transmission or distribution system as in claim 19 wherein said means for biasing comprises means for providing a first current through said diodes to adjust the third order Taylor series coefficient and means for providing a second current through one of said diodes to adjust the second order Taylor coefficient.

21. An optical transmission or distribution system as in claim 11 wherein said odd-wave nonlinear network comprises a differential driver having a first and a second output lead and two nominally identical two-port networks coupled in a symmetric arrangement such that congruent inputs are connected to respective ones of said first and second output leads of said differential driver, and wherein the output signal of said odd-wave non-linear network is taken between congruent output ports of said two-port networks.

22. An optical transmission or distribution system as in claim 21 wherein:
said two-port networks each comprise a bipolar junction transistor with a chain of N diodes connected to its base, a chain of M-1 diodes connected to its emitter, and a load resistor connected to its collector; and
wherein said odd-wave nonlinear network further comprises:
means to provide an output signal of said means for providing nonlinear pre-distortion as the differential voltage across the two collectors of said two transistors of said two-port networks; and
means to bias the transistor in its active region of operation and to bias the combination of two two-port networks to an odd-wave characteristic,
wherein said optical transmission or distribution system further comprises a pair of current sources driving, said chains of N diodes with a pair of currents having magnitudes centered about a selected current value.

23. An optical transmission or distribution system as in claim 22 wherein N=2 and M=3, nominally resulting in a transfer characteristic that provides a close approximation to the arc sine characteristic ideally required to cancel all orders of distortion for an ideal sinusoidal transfer characteristic of the light vs. electrical drive of said modulation means.

24. An optical transmission or distribution system as in claim 1 wherein:
said means to generate error signals comprises a plurality of error circuits, each having an output; and
said means to electronically process comprises a plurality of circuits, each comprising a low-pass filter having an input coupled to an output of an associated one of said error circuits.

25. An optical transmission or distribution system as in claim 1 wherein said electrical modulation signal comprises a frequency division multiplexed multichannel signal combining a plurality of individual channel signals.

26. An optical transmission or distribution system as in claim 25 wherein said individual channel signals comprise video signals.

27. An optical transmission or distribution system as in claim 25 wherein said individual channels signals comprise digital signals.

28. An optical transmission or distribution system as in claim 1 wherein said modulation signal comprises a digital signal.

29. An optical transmission or distribution system as in claim 1 wherein said modulation signal comprises a spread spectrum signal.

30. An optical transmission or distribution system as in claim 1 wherein said preconditioning means has a transfer characteristic substantially identical to the inverse of the transfer characteristic of said modulation means.

31. An optical transmission or distribution system as in claim 1 wherein said preconditioning means further comprise means for providing gain.

32. An optical transmission or distribution system as in claim 31 wherein said means for adjusting the transfer characteristic of said pre-conditioning means comprises means for adjusting said means for providing gain.

33. An optical transmission or distribution system as in claim 1 wherein said electrical modulation signal comprises an analog broadband signal.

34. An optical transmission or distribution system as in claim 1 wherein said preconditioning means further comprises means for providing frequency equalization.

35. An optical transmission or distribution system as in claim 34 wherein said means for providing frequency equalization comprises an electrical network that provides an overall frequency response such that the variations over frequency of the gain and of the group delay of the overall system are reduced.

36. An optical transmission or distribution system as in claim 35 wherein the frequency response of said modulation means and the frequency response of said means for providing electronic preconditioning provide substantially constant group delay, while providing an amplitude response which diminishes a substantially small amount over frequency such that the roll-off of the frequency response of said modulation means and of said means for providing electronic preconditioning are counteracted by said frequency equalizing electrical network and such that the group delay frequency dependence of said means for providing frequency equalization is substantially constant.

37. An optical transmission or distribution system as in claim 34 wherein said means to adjust said transfer characteristic of said pre-conditioning means comprises means for adjusting said frequency equalization.

38. An optical transmission or distribution system as in claim 1 wherein said means to adjust said transfer characteristic of said preconditioning means comprises means to modify the shape of the nonlinear transfer characteristic of said preconditioning means.

39. An optical transmission or distribution system as in claim 1 wherein said means to adjust said transfer characteristic of said preconditioning means comprises means to adjust the magnitude of at least one of the Taylor series coefficients of said transfer characteristic of said preconditioning means.

40. An optical transmission or distribution system as in claim 1 wherein said means for adjusting the modulation of said modulation means comprises means for adjusting said first non-linear modulation transfer characteristic.

41. An optical transmission or distribution system as in claim 1 wherein said means for adjusting the modulation of said modulation means comprises means for adjusting said bias point on said first non-linear modulation transfer characteristic.

42. An optical transmission or distribution system as in claim 2 wherein said continuous wave laser comprises a diode pumped solid state laser, or a distributed feedback semiconductor laser.

43. An optical transmission or distribution system as in claims 2 or 3 wherein said preconditioning means yields a substantially small second order Taylor coefficient of its transfer characteristic which said parametric feedback system acts to cancel by providing feedback to an adjusting parameter of an opposing second order Taylor coefficient of said modulation means.

44. An optical transmission or distribution system as in claims 1, 2, 3, or 4 wherein said means to route a portion of transmitted optical power to said monitoring receiver comprises a device selected from the group of devices consisting of a bulk optics beam-splitter, a fiber optic tap, and a fiber optic coupler.

45. An optical transmission or distribution system as in claims 1, 2, 3, or 4 wherein said means to route a portion of transmitted optical power to said monitoring receiver comprises an integrated optic tap or coupler contained on an integrated optic substrate which also contains said modulation means.

46. An optical transmission or distribution system as in claims 1, 2, 3, or 4 wherein said means to extract error signals is selected from the group of harmonic distortion detectors consisting of synchronous, coherent, and lock-in electronic detector circuits comprising a demodulation means performing a function selected from the group of functions consisting of multiplication, chopping, and switching, of the input signal with a reference signal harmonically related to said one or more pilot signals.

47. An optical transmission or distribution system as in claim 46 wherein said harmonic distortion detectors comprise a second order distortion detector and a third order distortion detector, wherein the reference signal for the second order distortion detector has a frequency twice the fundamental frequency of a selected pilot signal, and wherein the reference signal for said third order distortion detector has a frequency triple the fundamental frequency of said selected pilot signal.

48. An optical transmission or distribution system as in claim 46 wherein the reference signal for the second order distortion detector has a frequency equal to a sum or difference of the fundamental frequencies of a first and a second pilot signal, and wherein the reference signal for the third order distortion detector has a reference frequency equal to $\pm 2w_1 \pm w_2$ or $\pm w_1 \pm 2w_2$ in the case of two pilot signals or $\pm w_1 \pm w_2 \pm w_3$ in the case of three pilot signals, where $w_1$, $w_2$ and $w_3$ are the fundamental frequencies of said first, second, and third pilot signals, respectively.

49. An optical transmission or distribution system as in claim 4 wherein said parametric feedback system acts to cancel or reduce a second order Taylor coefficient of the transfer characteristic of said directly modulated laser by providing feedback to an adjusting parameter of the second order Taylor coefficient of the transfer characteristic of said preconditioning means.

50. An optical transmission or distribution system as in claim 4 wherein said directly modulated laser comprises a distributed feedback semiconductor laser, an external cavity laser, or a Fabri-Perot semiconductor laser.

* * * * *